United States Patent [19]
Zifferer et al.

[11] Patent Number: 5,349,518
[45] Date of Patent: Sep. 20, 1994

[54] METHOD AND APPARATUS FOR SYMBOLIC LADDER LOGIC PROGRAMMING WITH AUTOMATIC ATTACHMENT OF ADDRESSES

[75] Inventors: Scott C. Zifferer, Mequon; Joseph J. Menter, Jr., Milwaukee, both of Wis.

[73] Assignee: ICOM, Inc., West Allis, Wis.

[21] Appl. No.: 374,487

[22] Filed: Jun. 30, 1989

[51] Int. Cl.5 .............................. G06F 15/00
[52] U.S. Cl. .................... 364/192; 364/188; 364/191; 364/147; 364/DIG. 2; 364/927.2; 364/927.63; 364/943; 364/943.44; 364/946.2; 364/946.7; 395/161; 395/575
[58] Field of Search ... 364/200 MS File, 900 MS File, 364/200, 900, 188, 189, 147, 192, 191, 193; 371/19; 395/575, 700, 800, 161

[56] References Cited

U.S. PATENT DOCUMENTS

| | | | |
|---|---|---|---|
| 3,686,639 | 8/1970 | Fletcher et al. | 395/500 |
| 3,964,026 | 6/1976 | Wanauchi et al. | 395/141 |
| 4,038,533 | 6/1979 | Dummermuth et al. | 235/151.11 |
| 4,200,914 | 4/1980 | Kinter | 364/147 |
| 4,227,247 | 10/1980 | Kinter | 364/147 |
| 4,244,034 | 1/1981 | Cherba . | |
| 4,247,901 | 1/1981 | Martin et al. | 395/775 |
| 4,316,260 | 2/1982 | Hideshima | 364/144 |
| 4,396,974 | 8/1983 | Imazeki et al. | 364/138 |
| 4,415,965 | 11/1983 | Imazeki | 364/136 |
| 4,445,169 | 4/1984 | Wakiti et al. | 364/147 |
| 4,449,180 | 5/1984 | Ohshima et al. | 364/147 |
| 4,455,619 | 6/1984 | Masui et al. | 395/160 |
| 4,486,830 | 12/1984 | Taylor, Jr. et al. | 364/900 |
| 4,488,258 | 12/1984 | Struger et al. | 395/146 |
| 4,504,900 | 3/1985 | Yomogida et al. | 364/140 |
| 4,533,997 | 8/1985 | Furgerson | 364/200 |
| 4,616,307 | 10/1986 | Kusumi et al. | 364/147 |
| 4,635,183 | 1/1987 | Isobe et al. . | |
| 4,644,478 | 2/1987 | Stephens et al. . | |
| 4,661,899 | 4/1987 | Usuda . | |
| 4,663,704 | 5/1987 | Jons et al. | 364/188 |
| 4,703,414 | 10/1987 | Inoue et al. | 364/147 |
| 4,815,014 | 3/1989 | Lipner et al. . | |
| 4,833,592 | 5/1989 | Yamanaka . | |
| 4,843,538 | 6/1989 | Lane et al. . | |
| 4,891,786 | 1/1990 | Goldwasser | 364/419.08 |

OTHER PUBLICATIONS

"Microprocessor System Debugging"—Noordin Ghani et al., Research Studies Press—1980, pp. 77–82.
Taylor Industrial Software, *Product Bulletin #21*, Apr. 1987.
Tele-Denken Resources, Inc., *New Product News*, Jan. 1986.

(List continued on next page.)

*Primary Examiner*—Paul V. Kulik
*Attorney, Agent, or Firm*—Merchant, Gould, Smith, Edell, Welter & Schmidt

[57] ABSTRACT

The present invention discloses a method of identifying elements in a plurality of data table files of a programmable logic controller using symbols to represent the addresses thereof. This, and other techniques, provide means for managing and economizing the allocation of memory. The software package tracks which of the elements are represented by symbols and which of the elements are available. Symbols can be attached to element addresses by the user displaying a list of previously defined symbols and selecting a symbol from the list. Symbols can be attached to element addresses by the user selecting a particular Data Table file and simply requesting the next available element address from the file. Symbols can also be automatically attached to elements in new Data Table files. The user specifies the file type for the new Data Table file and the software package creates the new file. At the same time, the software package will automatically attach the symbol to the address of the first element in the new created file. The user has the option of manually attaching symbols to elements in the Data Table files. The user selects a Data Table file and the software package displays the contents of the file on the screen. The user positions the cursor on the desired element and the software package attaches the symbol to the address of the element.

4 Claims, 33 Drawing Sheets

OTHER PUBLICATIONS

Allen-Bradley, Inc., *Programming and Operations Manual*, Bulletin 1772.

ICOM, Inc., PLC-2 *Ladder Logistics User's Manual*, Aug. 1987.

ICOM, Inc., PLC-3 *Ladder Logistics User's Manual*, Sep. 1987.

ICOM, Inc., PLC-5 *Ladder Logistics User's Manual*, Sep. 1987.

Taylor Industrial Software, *Product Summary*, Feb. 1988.

Taylor Industrial Software, *Product Bulletin #1*, Apr. 1987.

Taylor Industrial Software, *Product Bulletin #25*, Aug. 1987.

Tel-Denken Resources, Inc., *TOPDOC Program Development Environment*, Nov. 1987.

Tele-Denken Resources, Inc., *TID Bits*, Second Quarter 1988.

```
OFFLINE    Prj:NEW_DEMO  Mode:Prog  Bkp:Dis Frc:No    RUNG 2:20/20
                         ┌──List of Currently Defined Symbols──────────────────┐
             ┌File Type─┐┌Address Type─┐
   ANOTHER_TIMER     T W
   CU_BTW_1SHOT      B B  Execute DIU instruction for one scan only.
   CU_BTW_CONTROL    N W
   CU_DATA_FILE      N W  Current output of LOOP1 PID control.
   CU_FIFO_CONTROL   R W  CU FIFO data acquisition file control block.
   CU_STORAGE        N W  CU data acquisition storage file.
   F1_TIMER_ADDRES   T W  PID Tuner Sample Rate Timer.
   FIRST_PASS_BIT    S B  PLC-5 performing First Program Scan
   FLOW_CONTROL      C W
   FREE_RUN_TIMER    T W
   GEORGE            B B
   GLASS_CHANGE      T W
   GLASS_FILL        T W
   JOG_PB            I B
 ▶ LED_0             O B Insert a rung/instruction before current cursor position
  F1      F2      F3      F4      F5      F6      F7      F8      F9      F10
Branch  blocK  Append  Insert  Replace  Delete  Undel   Edit io        Help
```

FIG. 27

```
OFFLINE  Prj:NEW_DEMO  Mode:Prog  Bkp:Dis Frc:No    RUNG 2:20/20

List of Currently Defined Symbols
      ┌─File Type─┐ ┌─Address Type─┐
ANOTHER_TIMER      T  W
CU_BTW_1SHOT       B  B  Execute DIV instruction for one scan only.
CU_BTW_CONTROL     N  W
CU_DATA_FILE       N  W  Current output of LOOP1 PID control.
CU_FIFO_CONTROL    R  W  CU FIFO data acquisition file control block.
CU_STORAGE         N  W  CU data acquisition storage file.
F1_TIMER_ADDRES    T  W  PID Tuner Sample Rate Timer.
FIRST_PASS_BIT     S  B  PLC-5 performing First Program Scan
FLOW_CONTROL       C  W
FREE_RUN_TIMER     T  W
GEORGE             B  B
GLASS_CHANGE       T  W
GLASS_FILL         T  W
JOG_PB             I  B
▶ LED_0            O  B Insert a rung/instruction before current cursor position
 F1      F2     F3      F4      F5       F6      F7     F8     F9    F10
Branch  blocK  Append  Insert  Replace  Delete  Undel  Edit_io       Help
```

FIG. 27

OFFLINE  Prj:NEW_DEMO  Mode:Prog  Bkp:Dis Frc:No  RUNG 2:10/20

Edit Address Info

| Address | Fixup | Type | Symbol |
|---------|-------|------|--------|
| T4:2 | T4:2 | Base | F1_TIMER_ADDRES |
| T4:2/13 | T4:2/13 | Relative | |
| R6:1 | R6:22 | Base | PU_FIFO_CONTROL |
| R6:1/13 | R6:22/13 | Relative | |
| R6:2 | R6:23 | Base | CU_FIFO_CONTROL |
| R6:2/13 | R6:23/13 | Relative | |
| N7:1 | N7:1 | Base | SCALED_TEMP_1 |
| N12:5 | N12:5 | Base | CU_DATA_FILE |
| N13:0 | N13:0 | Base | PU_STORAGE |
| N14:0 | N14:0 | Base | CU_STORAGE |

Press ENTER to Edit Item, Esc to Exit and Save
LOCAL Addresses are for Display Only, They Cannot be Edited

FIG. 31

| Maximum Number of Elements | File Type | File Number | 16-bit Words per Element |
|---|---|---|---|
| 32 | Output Image | 0 | 1 |
| 32 | Input Image | 1 | 1 |
| 32 | Status | 2 | 1 |
| 1000 | Bit | 3 | 1 |
| 1000 | Timer | 4 | 3 |
| 1000 | Counter | 5 | 3 |
| 1000 | Control | 6 | 3 |
| 1000 | Integer | 7 | 1 |
| 1000 | Floating Point | 8 | 2 |
| 1000 | User Assigned | 9–999 | 1 |

FIG. 34

| IF (Condition) | Then (Action) |
|---|---|
| Input Bit 01 is On | Turn Output Bit 01 On |

FIG. 35

METHOD AND APPARATUS FOR SYMBOLIC LADDER LOGIC PROGRAMMING WITH AUTOMATIC ATTACHMENT OF ADDRESSES

FIELD OF THE INVENTION

This invention relates generally to methods of developing ladder logic programs for Programmable Logic Controllers (PLCs). In particular, is directed to a method of symbolic ladder logic programming with the automatic attachment of symbols to PLC addresses.

BACKGROUND OF THE INVENTION

Programmable logic controllers (PLCs) perform many of the control functions for assembly line machines, machine tools, and other types of industrial equipment. For example, a part arriving at a workstation may contact and close a limit switch or other type of sensing device. As a result, an electrical circuit is completed or broken, and a signal is sent to a PLC indicating the change in condition. The PLC responds to the input as directed by a ladder logic program which, to a large degree, simulates the response of what used to be accomplished by older systems with a set of relays and other control devices. Ladder logic programs instruct the PLC how and when to react to the different signals it receives. The PLC, in turn, instructs the devices it controls in an appropriate manner as specified in the ladder logic program.

A PLC is comprised of a processor, memory, input modules, and output modules. FIG. 32 shows a PLC processor 344 and memory 346, wherein the PLC is (optionally) connected 348 to a personal computer 350. Ladder logic programs may be developed on the personal computer 350 and then downloaded to the PLC 342. The PLC processor executes the ladder logic program. The memory 346 stores output image tables, input image tables, timer storage, counter storage, and ladder logic program workspace. The input modules connect the PLC to input devices and can receive both digital and analog signals. The output modules connect the PLC to machines or other devices and can transmit either digital or analog signals to control them.

In most PLCs, such as those manufactured by the Allen-Bradley Company, memory is structured into "Data Table files" 360-378 as shown in FIG. 34. The memory may be divided into as many as 1000 different Data Table files 360-378. There are a plurality of different types of Data Table files 360-378, each serving a different purpose. These Data Table files comprise the Input Image 362, Output Image 360, Status 364, Bit 366, Timer 368, Counter 370, Control 372, Integer 374, and Floating Point 376 files.

The Input Image Data Table file 362 maintains the status of inputs to the PLC. A single bit in the Input Image Data Table file 362 represents the status of a single I/O point on an input module. If an input bit is ON, then a signal has been received at the input module. If the input bit is OFF, then no signal has been received at the input module.

The Output Image Data Table file 360 controls the outputs from the PLC. A single bit in the Output Image Data Table file 360 represents the status of a single I/O point on an output module. If an output bit is ON, then the PLC sends a signal to the output module. If the output bit is OFF, then the PLC does not send a signal to the output module.

The Timer Data Table file 368 reflects the status of timers executing in the ladder logic program. Timers keep track of timed intervals according to the ladder logic program. Timers consist of Accumulated Values and Preset Values. The timer intervals are stored in the Timer Accumulators and typically have three bases: (1) 1.0 seconds; (2) 0.1 seconds; and (3) 0.01 seconds. Timer status bits indicate whether the timer is enabled and whether it has timed out.

The Counter Data Table file 370 reflects the status of counters executing in the ladder logic program. Counters accumulate the number of events that occur in a ladder logic program, wherein an event is defined as the transition from a condition of "false" to "true". Counters consist of Accumulated Values and Preset Values. Counter status bits indicate the following: whether the counter has overflowed or underflowed; whether the Accumulator Value is greater than or equal to the Preset Value (i.e., "count complete"); an enable bit for "counter up" instructions; and an enable bit for "counter down" instructions.

The remaining Data Table files, Status 364, Bit 366, Control 372, Integer 374, and Floating Point 376, can perform a number of different functions. The various functions of these Data Table files are not essential to an understanding of the present invention.

The PLC 342 uses addresses to refer to words and bits in the Data Tables files 360-378. The addresses allow a ladder logic program to identify Data Table files 360-378, elements therein, and bits of the elements. Addresses are generally expressed as "<file type> <file number>: <element>.<subelement>/<bit number>". Thus, the address "B3:10/1" means "Bit file type; File #3; Element #10; Bit #1".

Addresses of elements in the Output Image 360 and Input Image 362 Data Table files are specified in octal format, i.e., 00-07 and 10-17 are valid bit addresses. All of the other file types use decimal addresses for elements. Bit Data Table files are "wordless". Addresses entered in a "word/bit" format are converted by the software package into a bit-only format. For example, if address B3:10/1 is entered by the user, the software package converts it to B3/161 (10 words×16 bits/-words+1 bit). The Output Image 360, Input Image 362, and Status 364 files are unique in that their maximum sizes are set by the PLC processor type as shown in FIG. 34. The remaining file types may contain a maximum of 1000 elements. File types may be duplicated as needed to allocate storage space. For example, if more timers than the 1000 available in file "T4" are needed, file "T9" can be created. Ideally, the user would assign timers (or other variables) sequentially to conserve memory.

As shown in FIG. 33, the ladder logic program 352 scanned by the processor of the PLC (and used to control the PLC) is a group of statements 354. These statements 354 are often displayed to programmers in a graphical manner comprising ladder diagrams and functional block instructions. Each statement 354, or "rung" of the ladder logic program 352, consists of at least one condition test 356 and at least one action 358 to be performed when the condition 356 is met. When the condition 356 is met, the rung is "true" and some action 358 is taken, for example, a signal is transmitted, a counter is enabled, a timer is started, etc. FIG. 35 shows an example "rung". If the input bit 01 has been turned "ON" 380 (i.e., a binary value of "1") by an input device, then the PLC responds by turning output bit 01 "ON" 382 (i.e., a binary value of "1").

The typical PLC is comprised of a number of categories of instructions, including a standard set of arithmetic, logical, move, diagnostic, register, comparison, and data transfer instructions, as would be found in any computer. Program control instructions are also available, allowing the user to structure the ladder logic programs.

In addition to the standard set of instructions, PLCs have a number of special-purpose machine control instructions. Relay-type instructions allow the PLC to monitor and control inputs and outputs for both digital and analog devices. Timer and counter instructions control interval timers and event counters. Sequencer instructions let the PLC monitor and control up to 16 I/O status bits at the same time. Immediate I/O instructions scan critical inputs or set critical outputs prior to normal I/O scans. Control instructions are available to let the PLC perform proportional, integral, and derivative (PID) control of processes and equipment.

In prior art ladder logic development systems, programmers can develop ladder logic programs on-line or off-line from the PLC, communicate with the PLC on-line to monitor the program's status, troubleshoot the ladder logic program, force the status of I/O status bits ON or OFF to simulate events, and perform a number of other functions. However, these prior art development systems offer little in the way of productivity aids for the ladder logic programmer and serve primarily as limited platforms for programming ladder logic.

SUMMARY OF THE INVENTION

To overcome the limitations in the prior art described above, and to overcome other limitations that will become apparent upon reading and understanding the present specification, the present invention discloses programmer productivity aids in the form of symbolic ladder logic programming with the automatic attachment of symbols to PLC addresses.

The present invention discloses a method of identifying elements in the PLC Data Table files using symbols to represent the addresses thereof. The software package tracks which of the elements are represented by symbols and which of the elements are available.

Symbols can be attached to ladder logic instructions by the user displaying a list of previously defined symbols and selecting a symbol from the list. A special Quick Search option is available when the list of previously defined symbols is displayed. As the user enters a portion of the symbol being searched for, the software package automatically positions to the corresponding point in the list. If the user continues to enter additional portions of the symbol, the software package narrows the search even further by positioning to the point in the list corresponding to the sum of all entered portions.

Symbols can be attached to element addresses by the user selecting a particular Data Table file and simply requesting the next available element address from the file. Because the software package tracks which elements are available, the symbol is automatically attached to the element address.

Symbols can also be automatically attached to elements in new Data Table files. The user specifies the file type for the new Data Table file and the software package creates the new file. At the same time, the software package will automatically attach the symbol to the address of the first element in the new created file.

The user has the option of manually attaching symbols to elements in the Data Table files. The user selects a Data Table file and the software package displays the contents of the file on the screen. The user positions the cursor on the desired element and the software package attaches the symbol to the address of the element.

The present invention discloses a method of managing I/O modules used by ladder logic programs in programmable logic controllers. The user identifies I/O points on the I/O module using symbols. The software package tracks which of the I/O points and modules are represented by symbols and which of the elements are available.

A method of transforming programmable logic controller addresses in blocks of ladder logic rungs is also provided. The user identifies the ladder logic instructions where the programmable logic controller addresses are to be transformed. The programmable logic controller addresses associated with the identified instructions are listed on a computer. The user enters a base transformation into the computer and the current programmable logic controller address is replaced with a fixup address. When the user specifies a relative transformation, addresses relative to the base fixup address will be automatically offset accordingly. The present invention, thus automatically determines the amount of memory to allocate.

DESCRIPTION OF THE DRAWINGS

In the drawings, where like numerals refer to like elements throughout the several views.

FIG. 17 is a screen that displays a list of currently defined symbols;

FIG. 28 is a screen that displays a ladder logic rung, wherein the user is attempting to assign a word-oriented symbol CYCLE_TIMER to a bit-oriented instruction;

FIG. 31 is an Edit Address screen, wherein the symbols and/or addresses in a block of rungs being moved can be re-attached or re-assigned in a batch operation;

FIG. 34 is an illustration describing the memory structure of the programmable logic controller;

FIG. 35 is an illustration describing the structure of a ladder logic rung;

DETAILED DESCRIPTION OF THE PREFERRED EMBODIMENT

Figure 1:
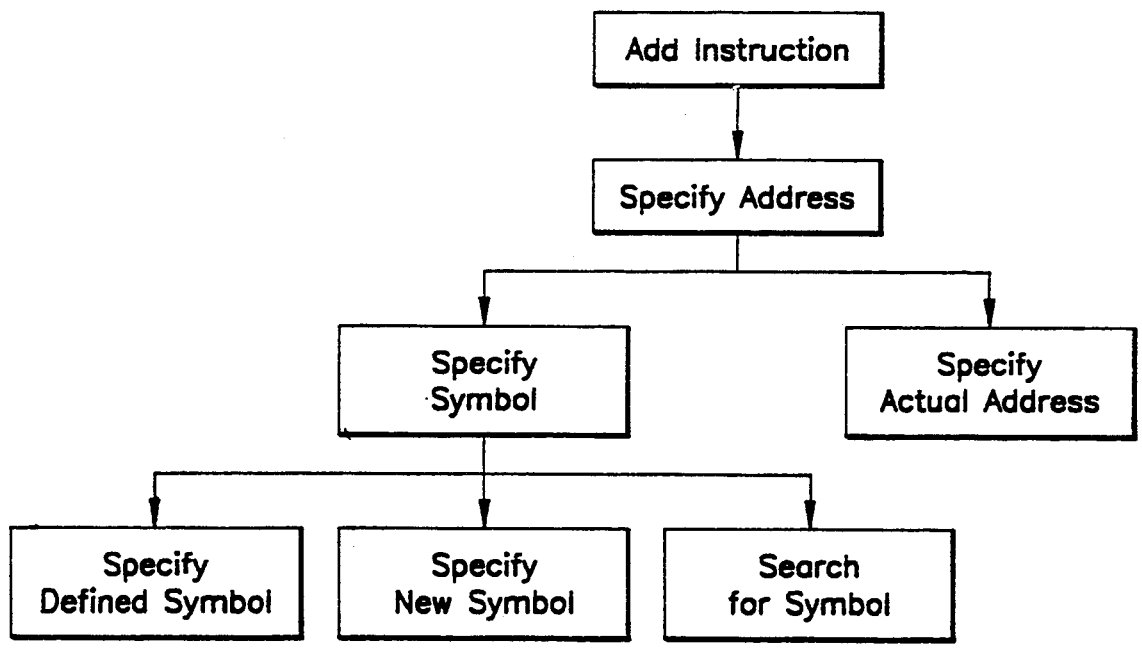
FIG. 1 is a block diagram describing the steps used to define symbols in the present invention.

In the following Detailed Description of the Preferred Embodiment, reference is made to the Drawings which form a part hereof, and in which is shown by way of illustration a specific embodiment in which the invention may be practiced. It is to be understood that other embodiments may be utilized and structural changes may be made without departing from the scope of the present invention.

General Description

The software package embodying the present invention is a menu-driven system used to develop ladder logic programs for Programmable Logic Controllers (PLCs). The software package is a programmer's "tool box" for developing ladder logic programs and includes: (1) off-line program development; (2) off-line processor emulation; (3) on-line program development; and (4) on-line station monitoring. Off-line program development provides the user the ability to develop ladder logic programs without connection to a PLC processor. Off-line emulation provides a user the ability to execute and debug ladder programs without the use of a PLC processor. On-line program development provides the user the ability to develop ladder logic programs while being connected to a PLC processor.

Additional information regarding this software package is available in the co-pending and commonly assigned patent applications "METHOD AND APPARATUS FOR PROGRAM NAVIGATION AND EDITING FOR LADDER LOGIC PROGRAMS BY DETERMINING WHICH INSTRUCTIONS REFERENCE A SELECTED DATA ELEMENT ADDRESS", by Zifferer et al., now U.S. Pat. No. 5,267,145, issued Nov. 30, 1993; "METHOD FOR EMULATING PROGRAMMABLE LOGIC CONTROLLER BY EXCHANGING INFORMATION BETWEEN DEBUG PROGRAM WHICH EMULATES I/O DEVICES AND LADDER LOGIC PROGRAM", by Zifferer et al., now U.S. Pat. No. 5,276,811, issued Jan. 4, 1994; "METHOD AND APPARATUS FOR CREATING CUSTOM DISPLAYS FOR MONITORING LADDER LOGIC PROGRAMS" by Zifferer et al., now U.S. Pat. No. 4,991,076, issued Feb. 5, 1991; and "METHOD AND APPARATUS FOR SECURING ACCESS TO A LADDER LOGIC PROGRAMMING AND MONITORING SYSTEM", by Zifferer et al., now U.S. Pat. No. 5,127,099, issued Jun. 30, 1992, all of which applications were filed on even date herewith, and all of which applications are hereby incorporated by reference.

Program Editing

The Editing options within the software package allow the user to generate, edit, and modify ladder logic programs using powerful editing tools. Methods of building rungs in ladder logic programs are well known in the prior art. However, the software package of the present invention includes advanced functions that aid in the program development process, including symbolic programming and the automatic attachment of addresses (hereinafter referred to as auto-addressing). Symbolic ladder logic programming allows the user to refer to bits and words using easy to remember symbols instead of complex addresses, for example, PUSH_BUTTON_1 instead of I:03/10. The auto-addressing option allows the software package to keep track of which addresses are used and which addresses are still available.

Symbolic Ladder Logic Programming

Symbols are identifiers that can be associated with, and used interchangeably for, PLC addresses. Symbols are usually comprised of, but are not limited to, text strings or graphical icons. Symbolic ladder logic programming makes it easier for the user to remember addresses. In addition, the software package provides a number of powerful functions to help the user manage symbols.

FIG. 1 is a block diagram describing the steps used to define symbols in the present invention. Once the user associates or "attaches" a symbol and an address, either the symbol or the address can thereafter be used to refer to the address. For example, the user could attach the symbol PUSH_BUTTON_1 to the address I:03/10. Any further references to that address can be made by substituting the symbol PUSH_BUTTON_1.

Figure 36:
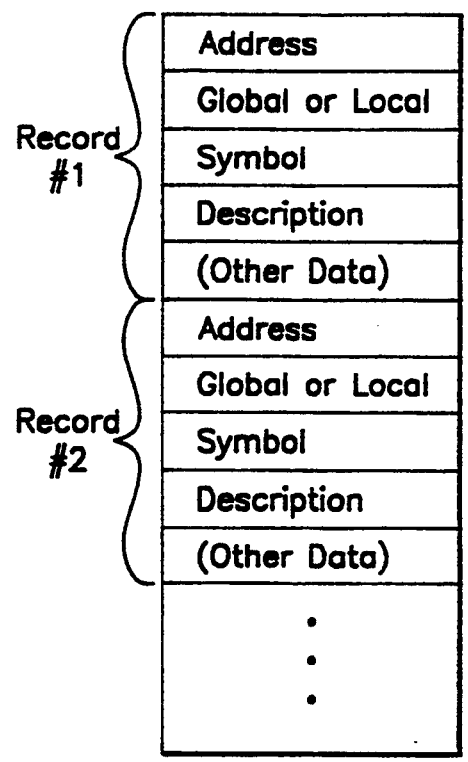
FIG. 36 shows the structure of the attachment file that links symbols and addresses.

FIG. 36 describes a database file 384 that maintains the "attachment" between symbols 392 and addresses 388. Each record 386 in the attachment file 384 is comprised of the PLC address 388, a global/local identifier 390, a symbol 392, a description of the symbol 394, and other data 396 not related to "attachments". The software package can search the attachment file 384 in two ways: (1) supplying an address 388 and searching the file 384 for the attached symbol 392; or (2) supplying the symbol 392 and searching the file 384 for the attached address 388.

Symbols 392 can be attached to addresses 388 in two different ways. The user can enter a new symbol 392 in the ladder logic program and then define the address 388 attached to it. Alternatively, the user can enter an address 388 and then define the attached symbol 392 using the Instruction Description Editor, described herein later.

Figure 37:
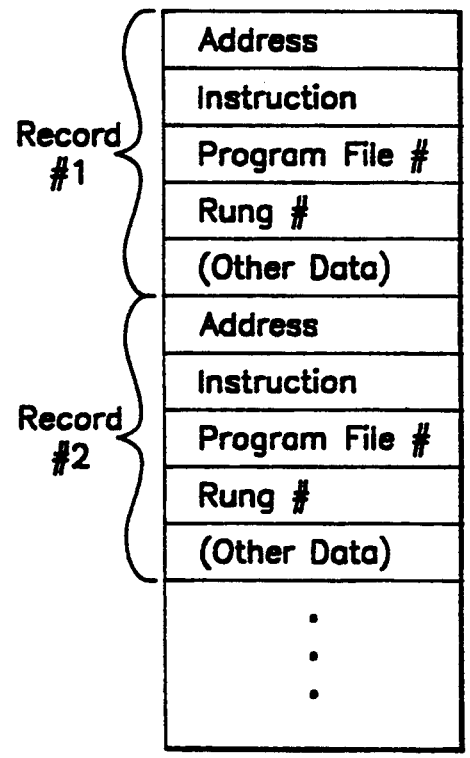
FIG. 37 shows the structure of the cross-reference file that identifies address usage in ladder logic programs.

FIG. 37 describes a database file 398 where the software package maintains cross-reference information for the addresses 402. Each record 400 in the cross-reference file 398 is comprised of the PLC address 402, an identifier for each instruction that uses the address 404, a program file number containing the instruction 406, a rung number in the program file where the instruction is located 408, and other data 410. The software package can search the cross-reference file 398 in two ways: (1) supplying an address 402 and searching the cross-reference file 398 for the locations 406 and 408 where the address 402 is used; or (2) supplying the symbol 392 and searching the attachment file 384 first for the attached address 388, then, using that address 388, searching the cross-reference file 398 for the locations 406 and 408 where the symbol 392 (i.e., address 402) is used.

Defining A New Symbol

Figure 2:
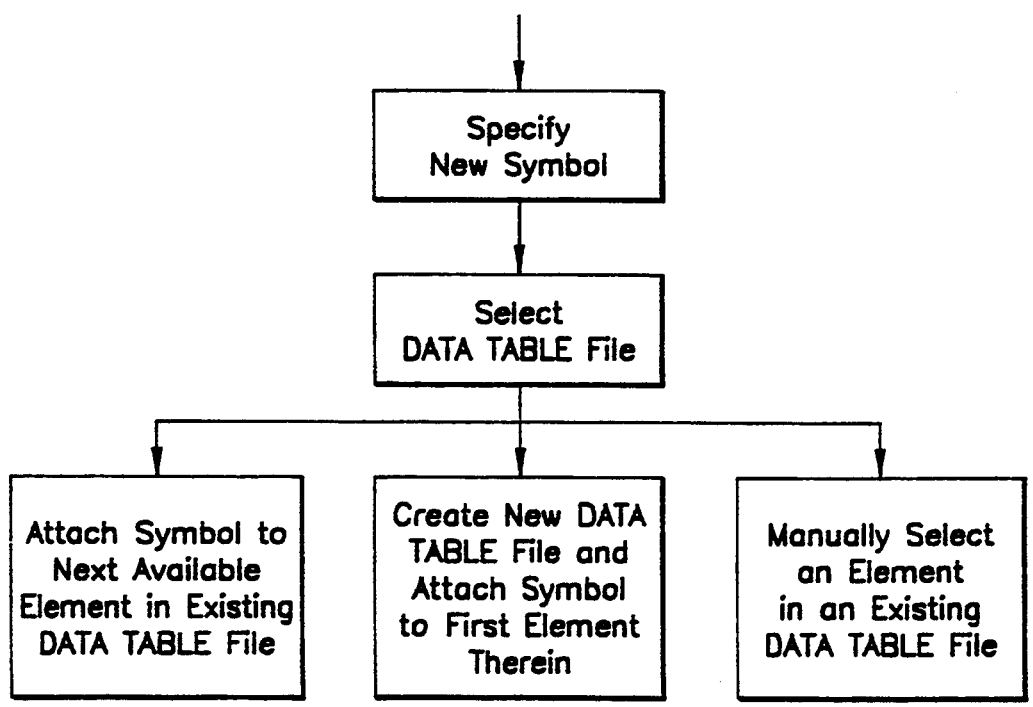
FIG. 2 is a block diagram describing the steps used to attach symbols to addresses of elements in memory.
Figure 4:
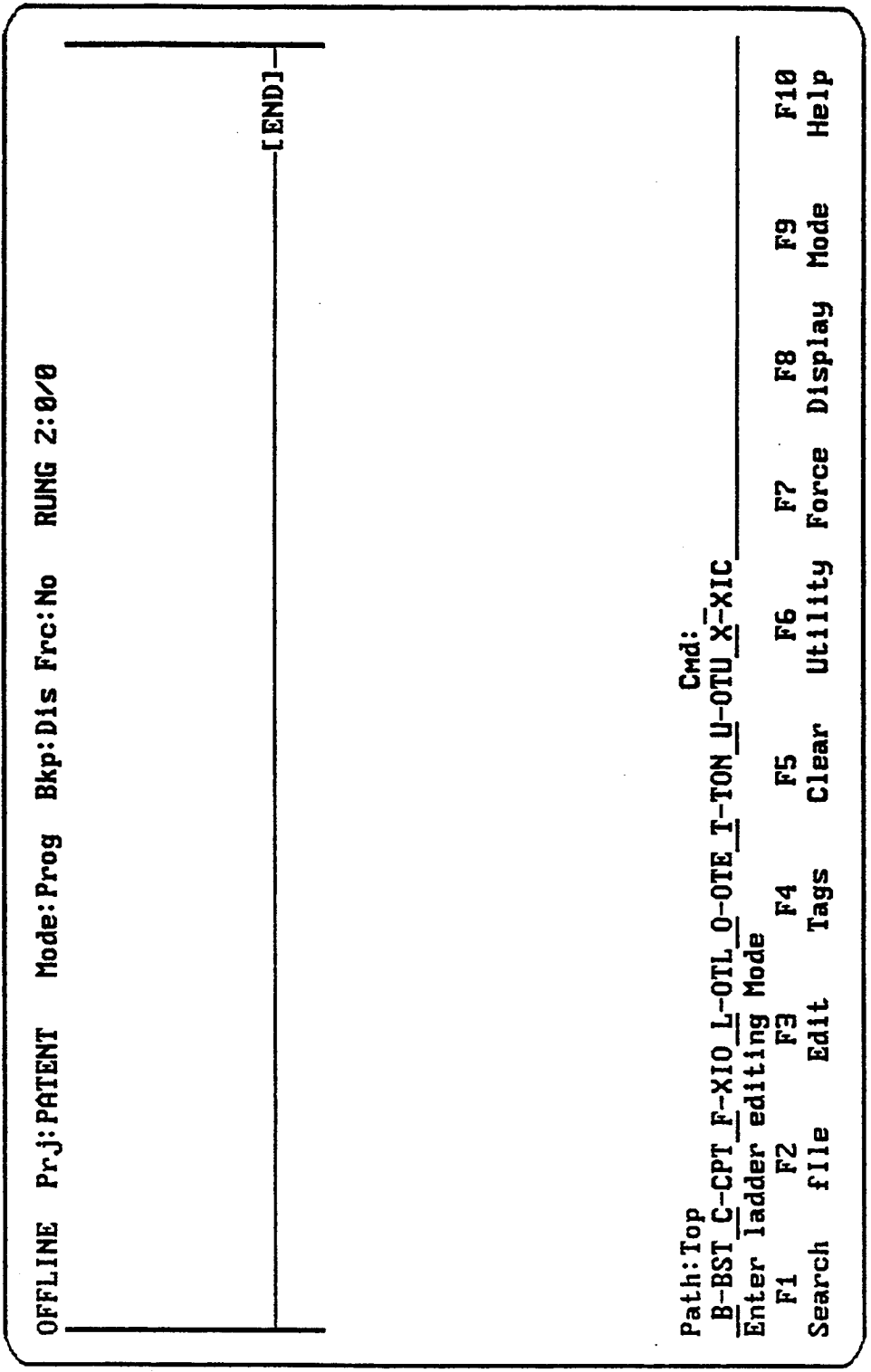
FIG. 4 is a blank screen where the user begins editing the ladder logic program.

FIG. 2 is a block diagram describing the steps 16–24 used to attach symbols to addresses of elements in memory. FIG. 4 is a blank screen 36 where the user begins editing the ladder logic program 38. Above each function key identifier 42–60 across the bottom of FIG. 4, there is a description of the function performed by the key. When a function key 42–60 is selected by the user, the cursor highlights the particular function description.

Figure 5:
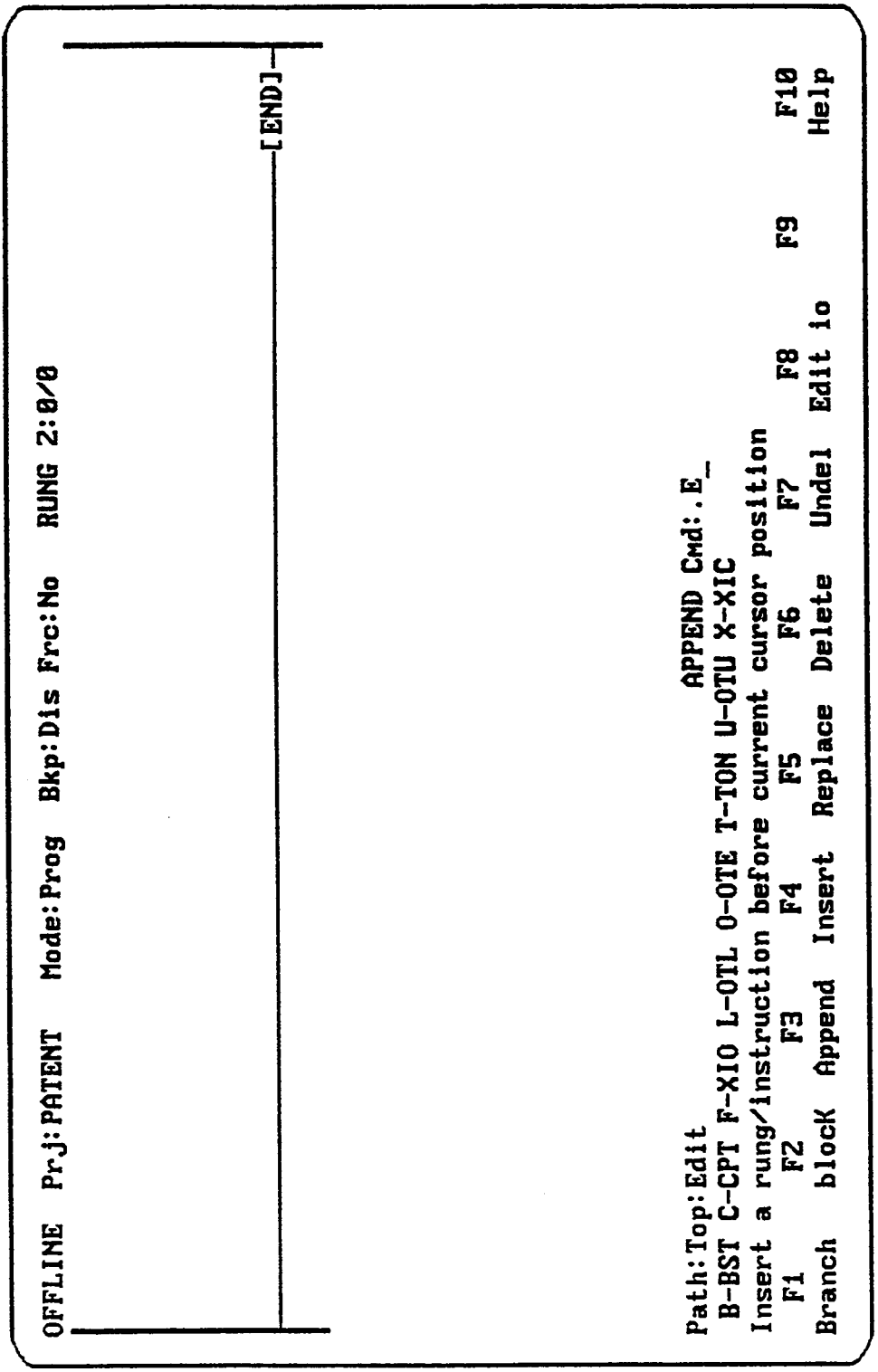
FIG. 5 is a screen displayed when the F3 (Edit) key is pressed at FIG. 4.

When the F3 (Edit) key 46 is pressed by the user, FIG. 5 is displayed. Across the bottom of FIG. 5 is an editing menu describing the functions 62–78 available. At this point, a rung 40 can be added to the ladder logic program 38.

Figure 6:
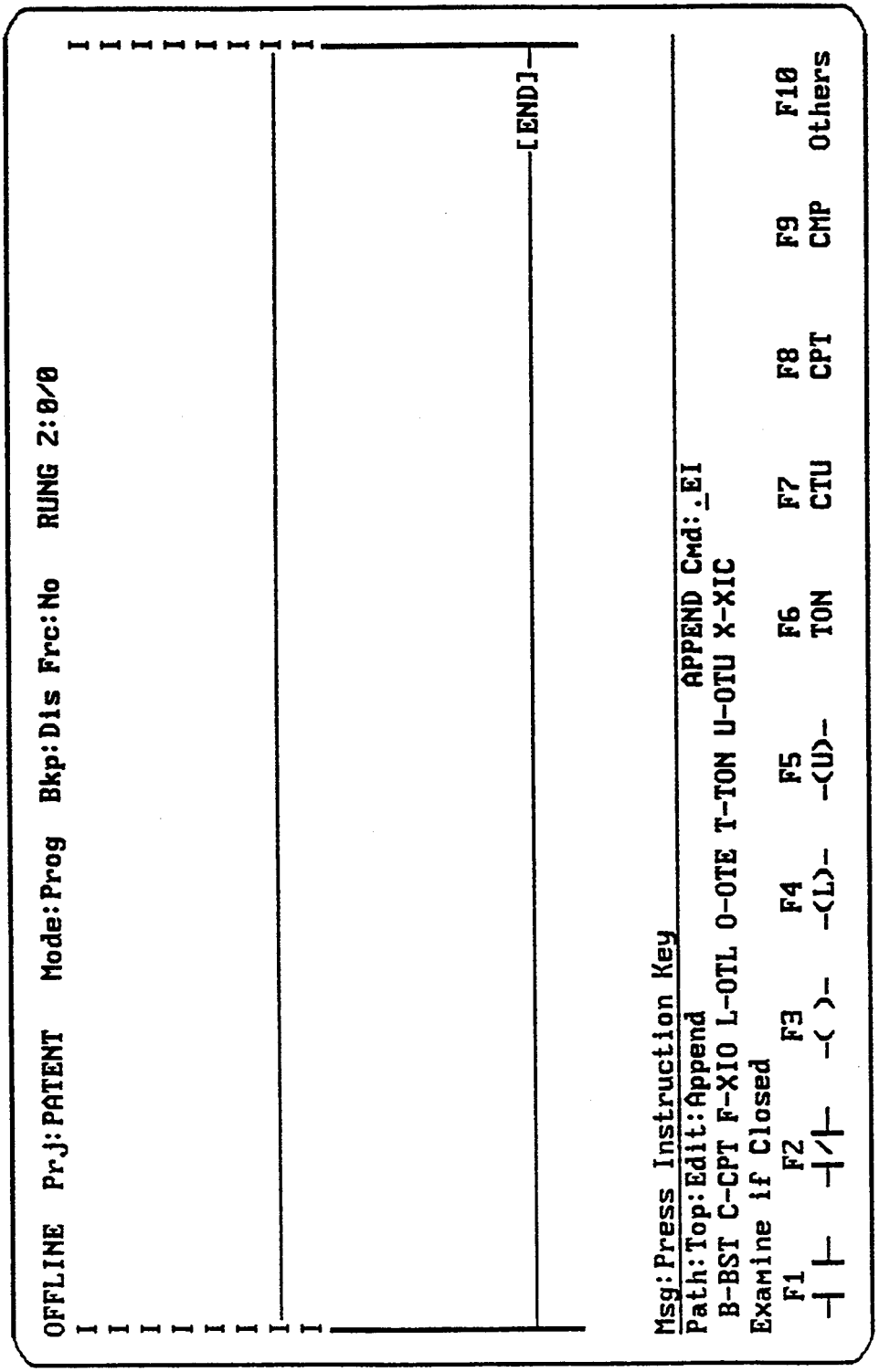
FIG. 6 is a screen displayed when the F3 (Append) key is pressed at FIG. 5.

When the F3 (Append) key 66 is pressed, FIG. 6 is displayed. Across the bottom of FIG. 6 is an instruction menu 80–98 graphically and mnemonically describing some of the most commonly used instructions. These ladder logic instructions, and their corresponding graphical and mnemonic representations, are well known in the prior art and therefore will not be described here. A user can select an instruction using either the function keys 80–98, or, by manually specifying the instruction. The Examine If Closed instruction may be selected, for example, by pressing the F1 key 80.

Figure 7:
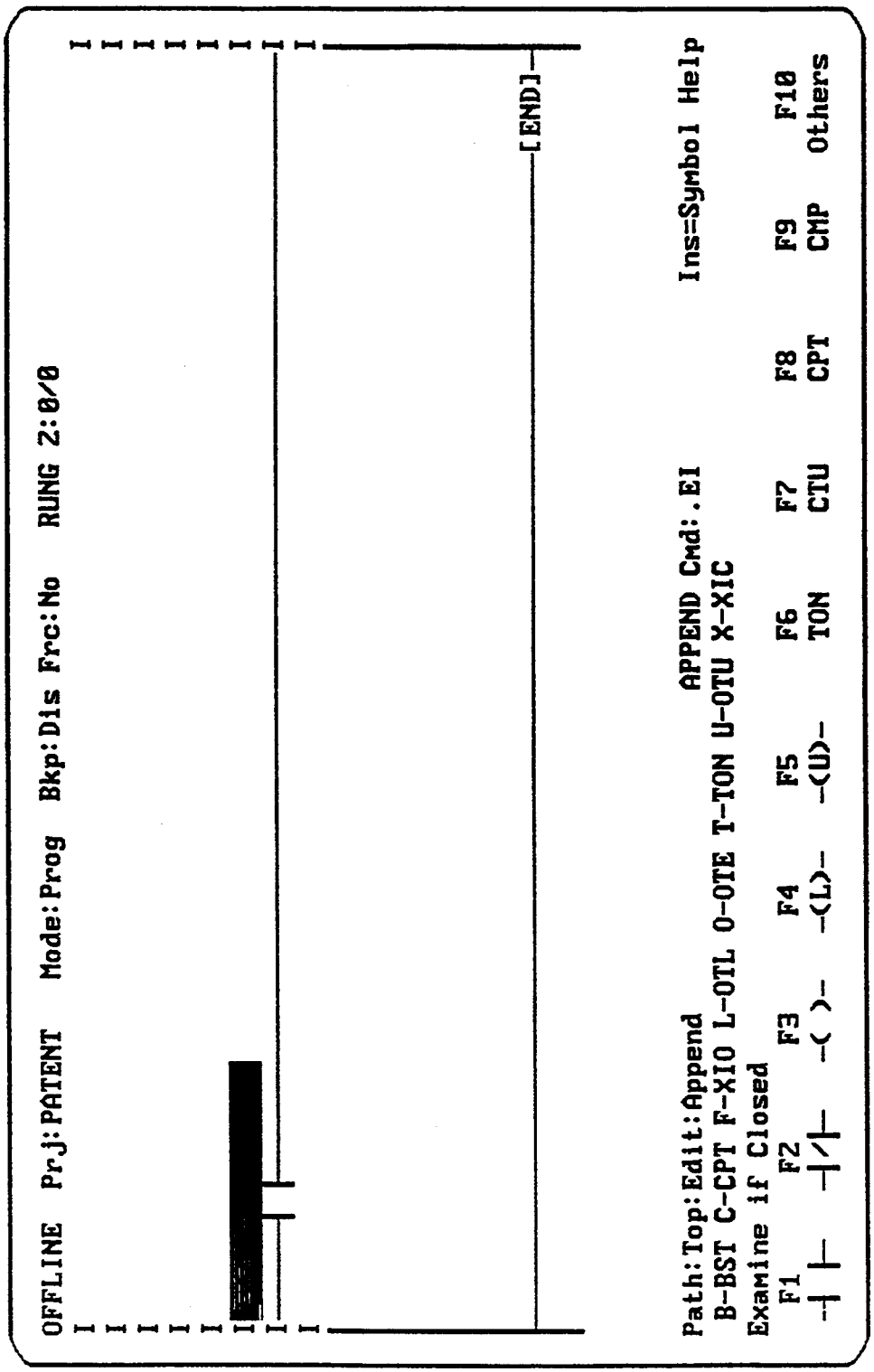
FIG. 7 is the screen of FIG. 6 after the Examine If Closed instruction has been selected.

FIG. 7 shows the screen after the Examine If Closed instruction has been selected. The instruction 100 is graphically represented on the ladder logic rung 102, just to the right of the power rail 104 on the left side of the screen. The cursor is positioned in a field 106 above the instruction 100, as represented by the box 106 in FIG. 7. At this point, the user must enter either an address, or a symbol representing an address, for the Examine If Closed instruction 100. Alternatively, the user can press the Insert key and a list of user-defined symbols will be displayed, as described herein later.

Figure 8:
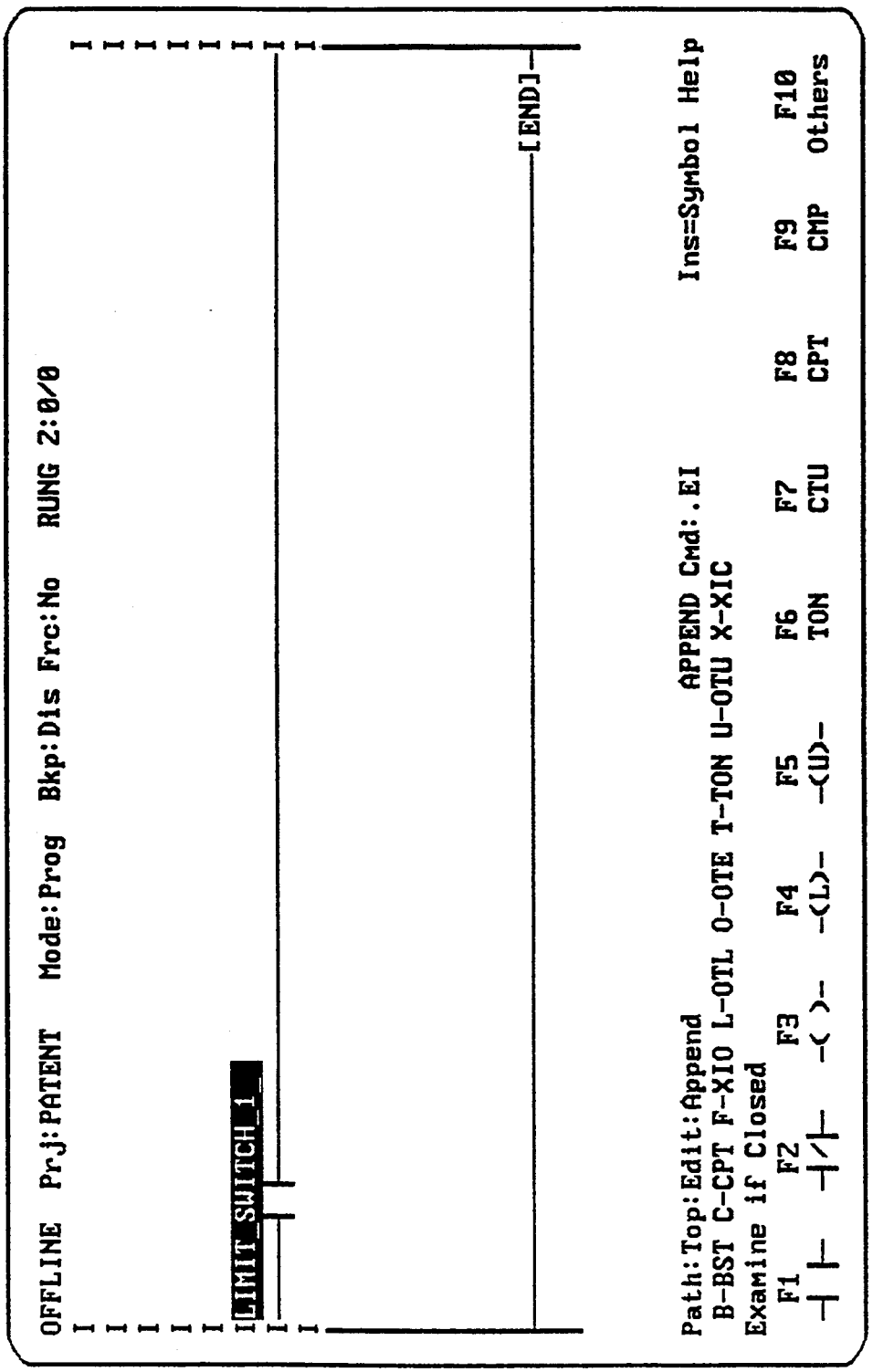
FIG. 8 shows an example of a symbol, LIMIT_SWITCH_1, entered into an address/symbol field of the instruction of FIG. 7.

FIG. 8 is an example of a symbol, LIMIT_SWITCH_1 108, entered by the user into the field 106. Ideally, the user would choose symbols which promote easy recognition. Further, there are two ways for a user to define a symbol: with or without auto-addressing.

Auto-Addressing

Figure 9:
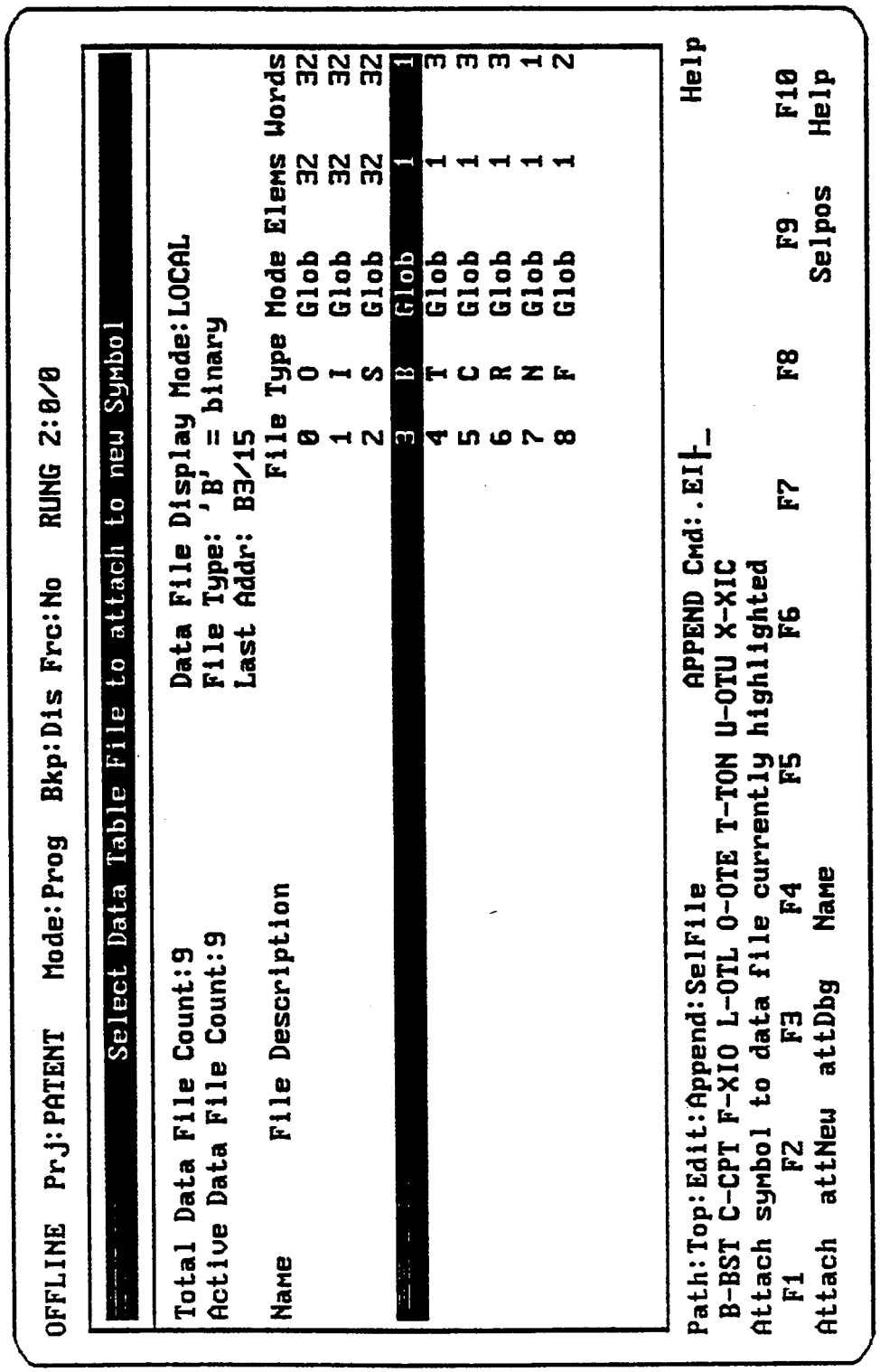
FIG. 9 is a screen that displays a list of Data Table files, wherein the cursor is positioned as illustrated by the highlight bar.

When a symbol 108 has been entered in the field 106 shown in FIG. 8, and the Enter key is pressed, FIG. 9 is displayed. FIG. 9 displays a list of Data Table files 110, wherein the cursor is positioned as illustrated by the highlight bar 112. The highlighted Data Table file is file #3 as indicated by the "3" identifier 114 in the "File" column. The file is a Bit Data Table file as indicated by the "B" identifier 116 in the "Type" column. The file is a global file as indicated by the "Glob" identifier 118 in the "Mode" column. The file is comprised of a single element as indicated by the "1" identifier 120 in the "Elems" column. The file is comprised of one 16-bit word as indicated by the "1" identifier 122 in the "Words" column. The lack of identifiers in the "Name" 124 and "File Description" 126 columns indicate that the user has not named or described the file.

Three options are available to the user with auto-addressing: Attach, Attach New, and Select Position. The Attach option, invoked by pressing the F1 (Attach) key 128, permits the user to attach the symbol, LIMIT_SWITCH_1 108, to the next available address in the Data Table file indicated by the highlight bar 112. The Attach New option, invoked by pressing the F2 (attNew) key 130, permits the user to create a new Data Table file, and attach the symbol, LIMIT_SWITCH_1 108, to the first address in the new Data Table file. The Select Position option, invoked by pressing the F9 (Selpos) key 136, permits the user to attach the symbol, LIMIT_SWITCH_1 108, to a specific address in the Data Table file indicated by the highlight bar 112.

Figure 10:
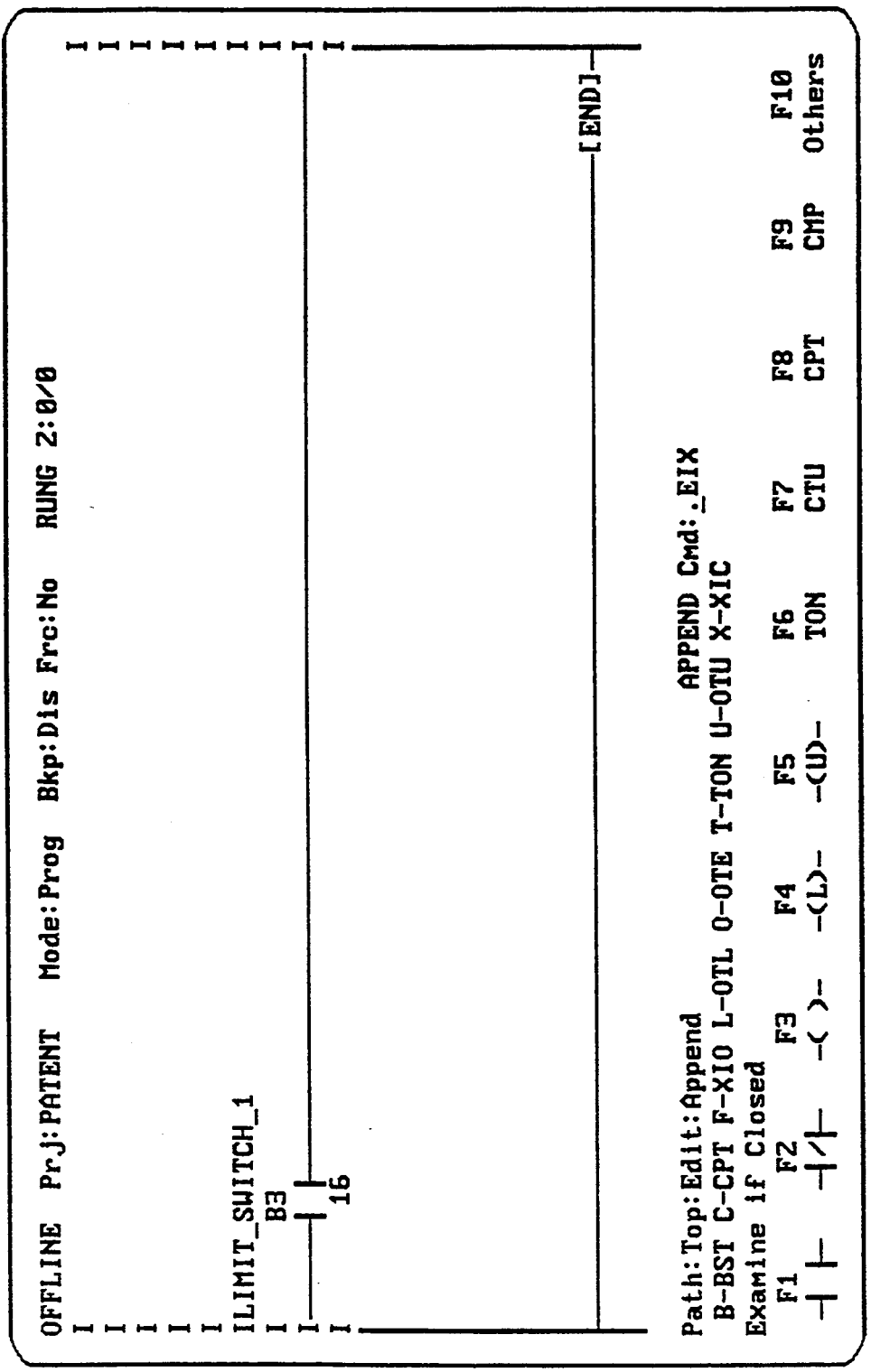
FIG. 10 shows the ladder logic rung of FIG. 8, wherein the symbol LIMIT_SWITCH_1 has been attached to the address B3:16.

If the F1 (Attach) key 128 is pressed with the cursor in FIG. 9 positioned 112 on a file in the list of Data Table files, FIG. 10 is displayed. FIG. 10 shows the ladder logic rung 102 of FIG. 8, wherein the symbol LIMIT_SWITCH_1 108 has been attached to the address B3:16 (binary file #3 138; bit position 16 140). The address B3:16 was automatically selected by the software package as the next available address in binary file #3. Further, if there are no unused addresses in binary file #3, then the Attach option allocates a new element in the Data Table file, and attaches the symbol LIMIT_SWITCH_1 108 to the element's address.

Figure 11:
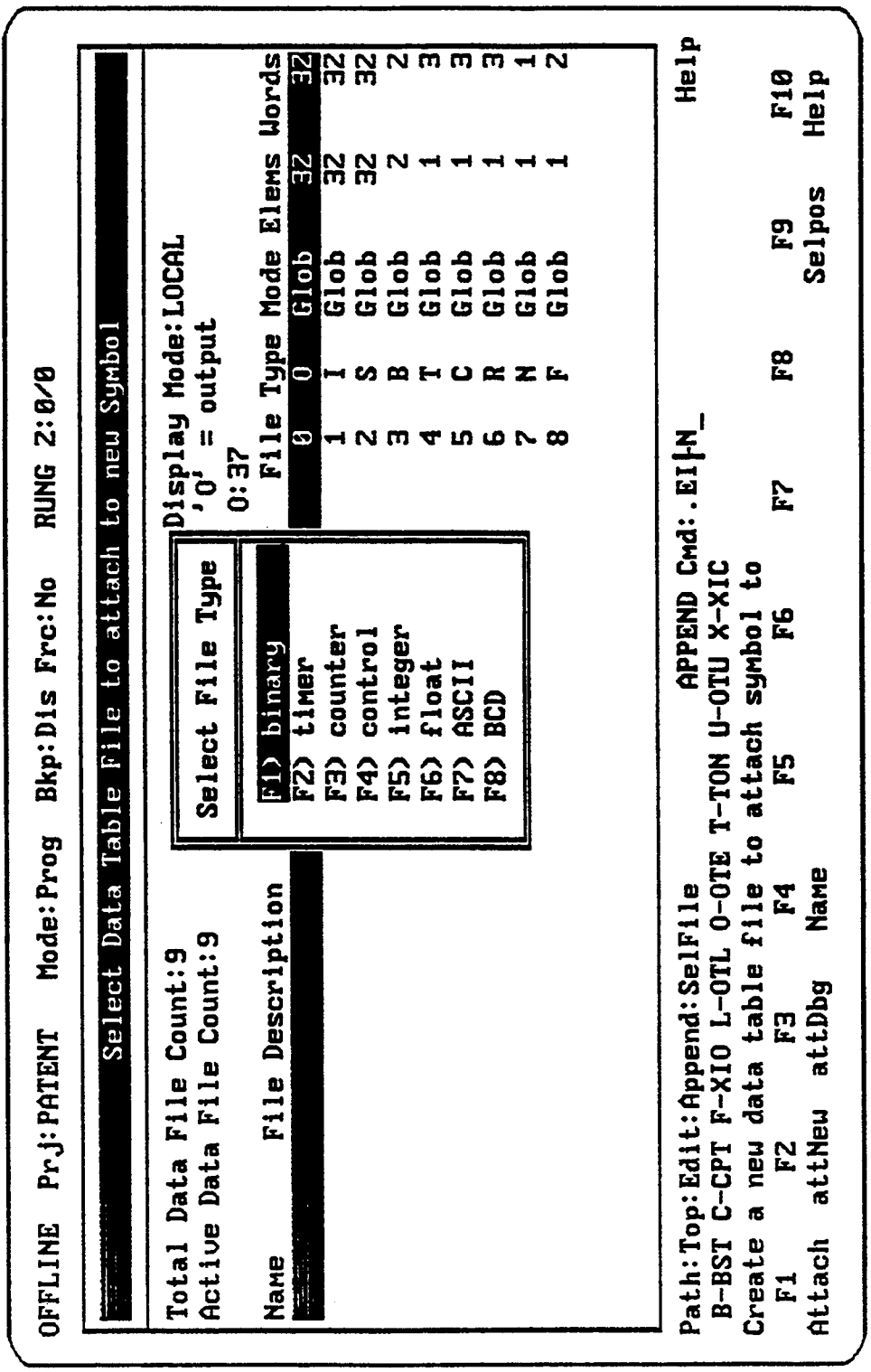
FIG. 11 shows a window overlaying the screen of FIG. 9, wherein the user enters a File Type for a new file.

Returning now to FIG. 9, if the F2 (attNew) key 130 is pressed with the cursor positioned 112 on a file in the list of Data Table files, a small window 142 overlays the screen as shown in FIG. 11. This window 142 allows the user to assign a file type to the new Data Table file. The user moves the cursor to highlight 144 the file type 146–160 desired, and presses the Enter key to accept the file type 146–160. Alternatively, the user can press the function key associated with the file type 146–160. Another small window overlays the screen (not shown) and the user identifies the file as either "local" or "global" to control file access. Global access means that any ladder logic program may access the Data Table file. Local access means that only the current ladder logic program, the one that created the Data Table file, can access the Data Table file. The next available unused Data Table file is allocated as the new Data Table file. The software package economizes on space by keeping the Data Table files contiguous in memory. Once the new Data Table file is allocated, the address of the first element therein is automatically attached by the software package to the symbol LIMIT_SWITCH 1 108.

Figure 3:
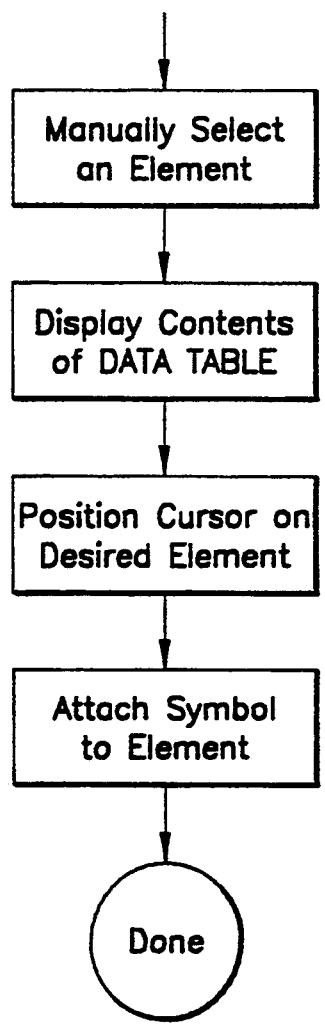
FIG. 3 is a block diagram describing the steps used in manually selecting addresses for symbols.
Figure 12:
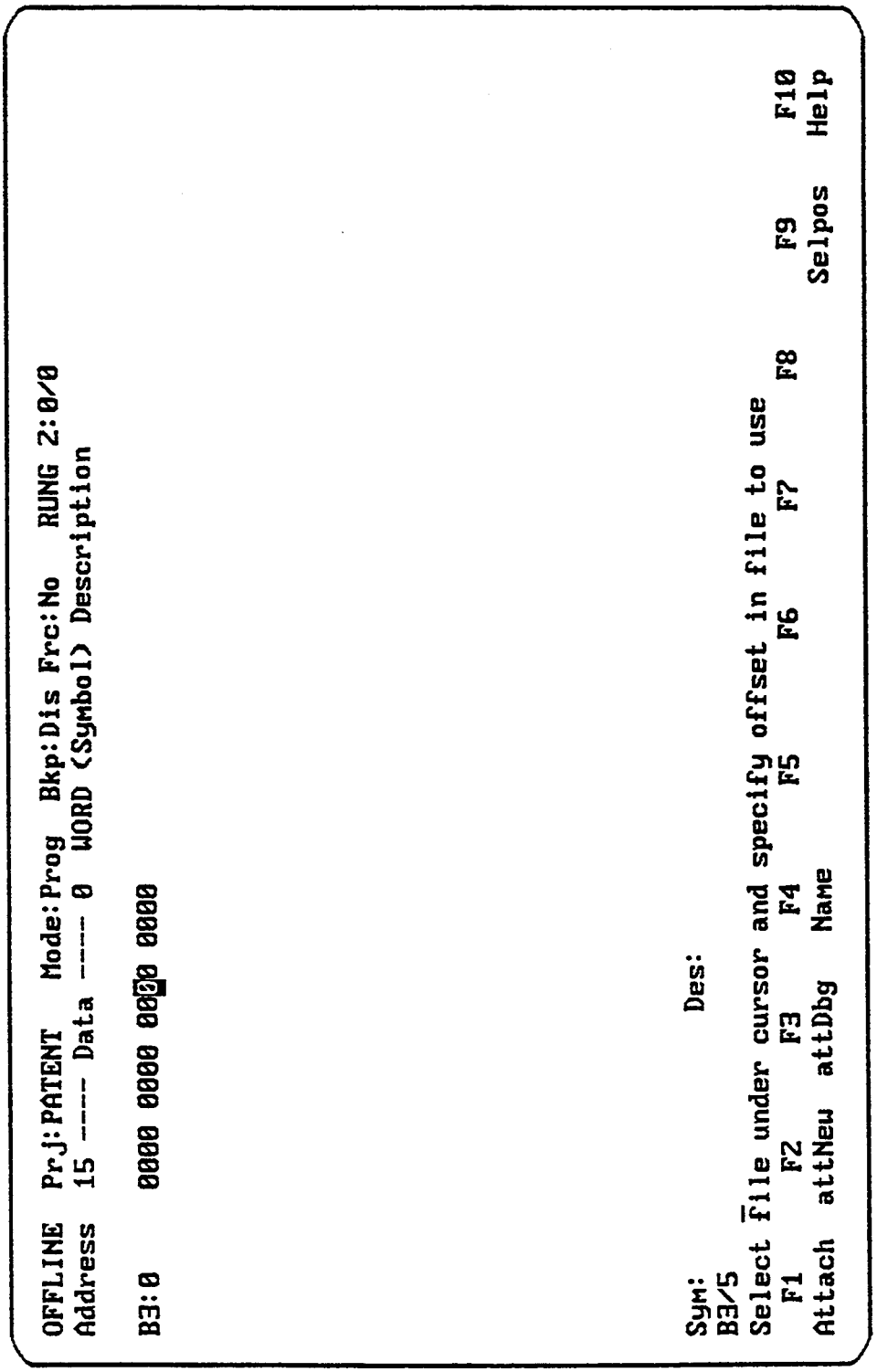
FIG. 12 is a screen that displays the contents of a binary Data Table file comprised of a single 16-bit word.

Returning now to FIG. 9, if the F9 (Selpos) key 136 is pressed with the cursor positioned 112 on a file in the list of Data Table files 110, FIG. 12 is displayed. The Select Position option requires "manual" attachment of the symbol to the address. FIG. 3 is a block diagram describing the steps used in manually selecting addresses for symbols. The Select Position option displays 162 all the addressable positions in the highlighted Data Table file. FIG. 12 shows the contents of Data Table file #3, which is a binary file comprised of a single 16-bit word or 16 bit positions. The bit positions are identified on the left side of FIG. 12 by the legend "B3:0" 164. Immediately to the right of the legend are the bit identifiers 166. The bit identifiers 166 are displayed as four groups of four bits. In this instance, each bit is zero, representing an "OFF" state. The user can select a specific bit (or word) in Data Table file by positioning the cursor 168 over the bit (or word). By pressing the Enter key, the user creates the attachment between address and symbol.

Some instructions used in a ladder logic program 38 use only specific types of Data Table files. With such instructions, the software package will list only valid Data Table files when a new symbol is being entered.

Figure 13:
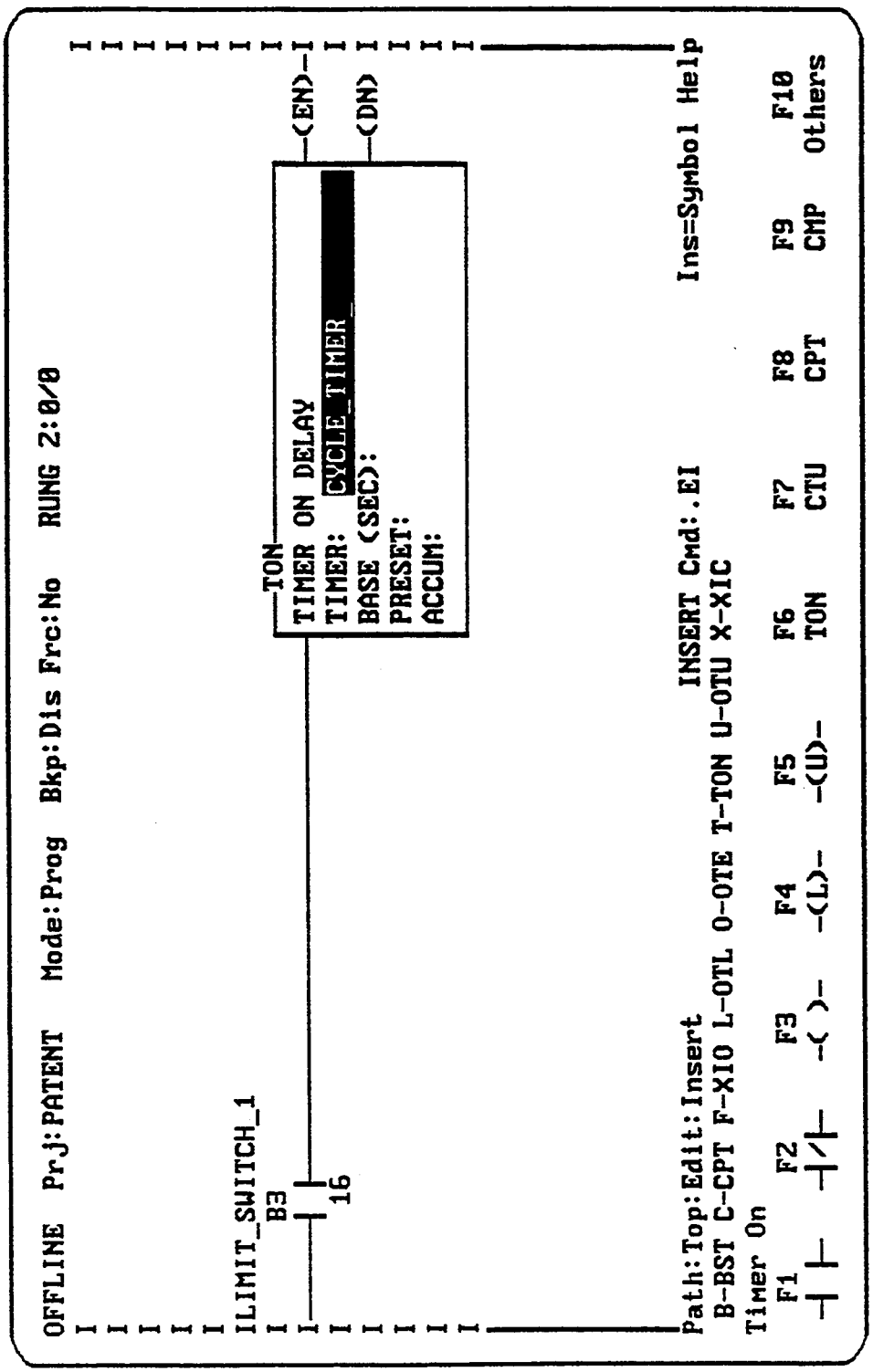
FIG. 13 is a screen that displays a ladder logic rung with a timer instruction.

FIG. 13 shows a ladder rung 102 with a timer instruction, TON 170. The cursor is positioned at the "TIMER:" field 172 as indicated by the box. A symbol 174, CYCLE_TIMER, is entered by the user into the field 172. After the Enter key is pressed, FIG. 14 is displayed.

Figure 14:
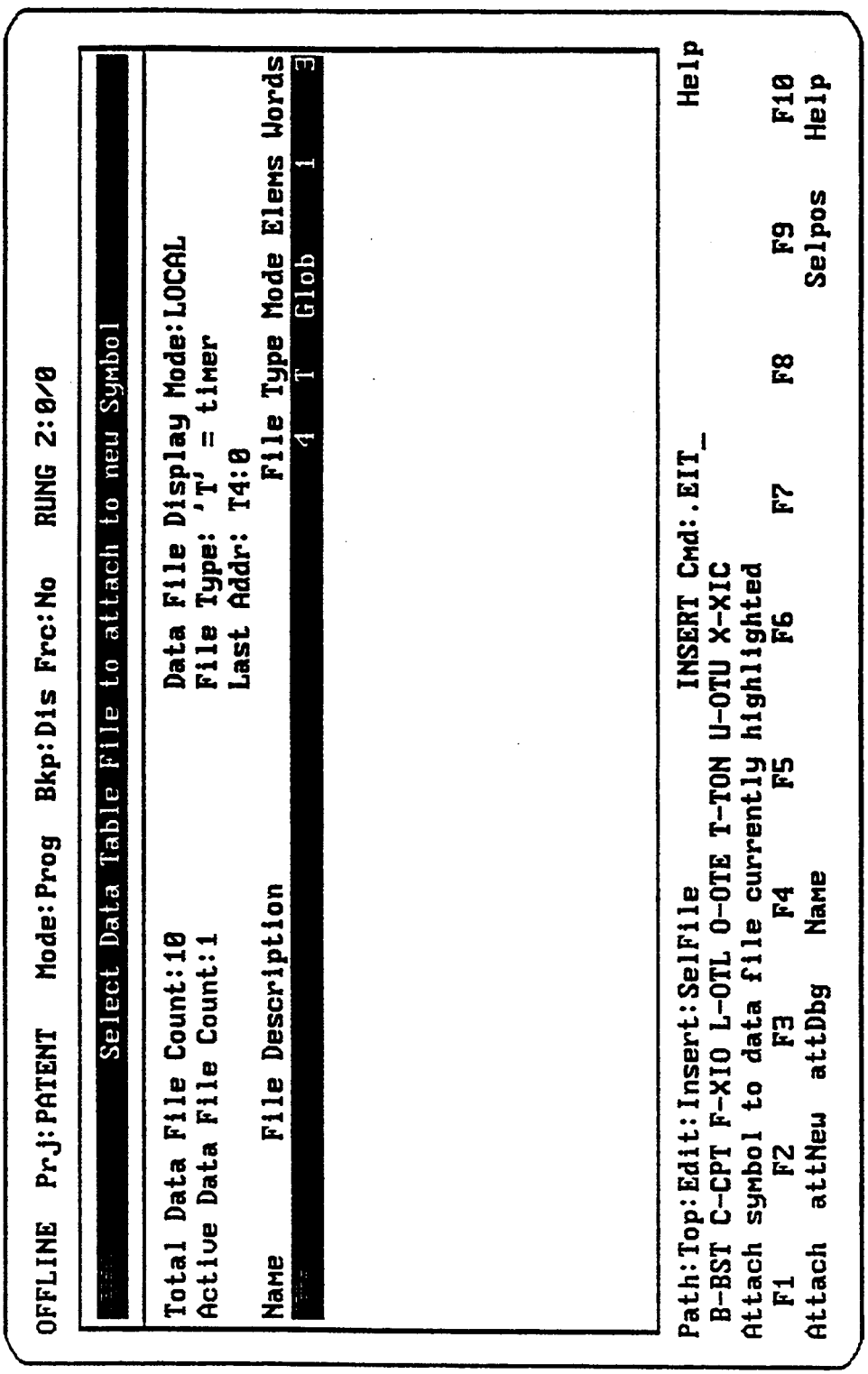
FIG. 14 is a screen that displays a list of valid Data Table files for the timer instruction of FIG. 13.

FIG. 14 displays a list 110 of valid Data Table files for this timer instruction. The highlighted 112 Data Table file, the only file on the list, is file #4 as indicated by the "4" identifier 114 in the "File" column. The file is a timer Data Table as indicated by the "T" identifier 116 in the "Type" column. The file is a global file as indicated by the "Glob" identifier 118 in the "Mode" column. The file is comprised of a single element as indicated by the "1" identifier 120 in the "Elems" column. The file is comprised of three 16-bit words as indicated by the "3" identifier 122 in the "Words" column. The lack of identifiers in the "Name" 124 and "File Description" 127 columns indicate that the user has not named or described the file.

FIG. 14 displays only timer files because the timer instruction TON 170 can only use a specific area of memory allocated to timer files. This feature of the software package prevents errors by the user, as well as speeding the program development process.

Figure 15:
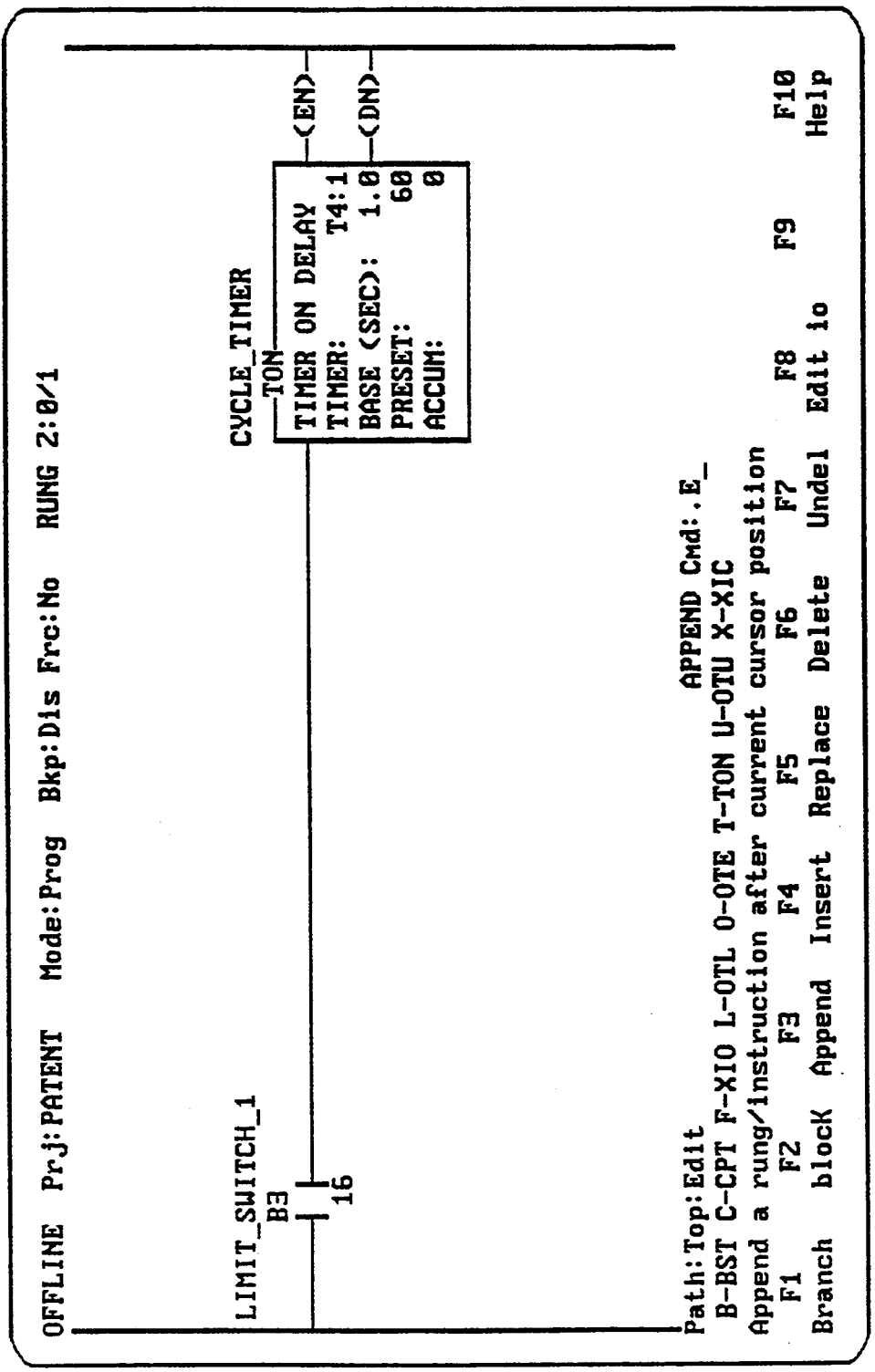
FIG. 15 is a ladder logic rung of FIG. 13, wherein, wherein the symbol CYCLE_TIMER has been attached to the address T4:1.

FIG. 15 shows an example of a completed rung 102 after the symbol CYCLE_TIMER 174 has been attached to address T4:1 176. As described herein later, the screen 36 is configurable, so the user can see both symbols 108 and 174 and addresses 138, 140 and 176. The screen 36 can be reconfigured as desired to display only symbols 108 and 174, only addresses 138, 140 and 176, or as in FIG. 15, both symbols 108 and 174 and addresses 138, 140 and 176.

I/O Module System Configurator

Figure 16:
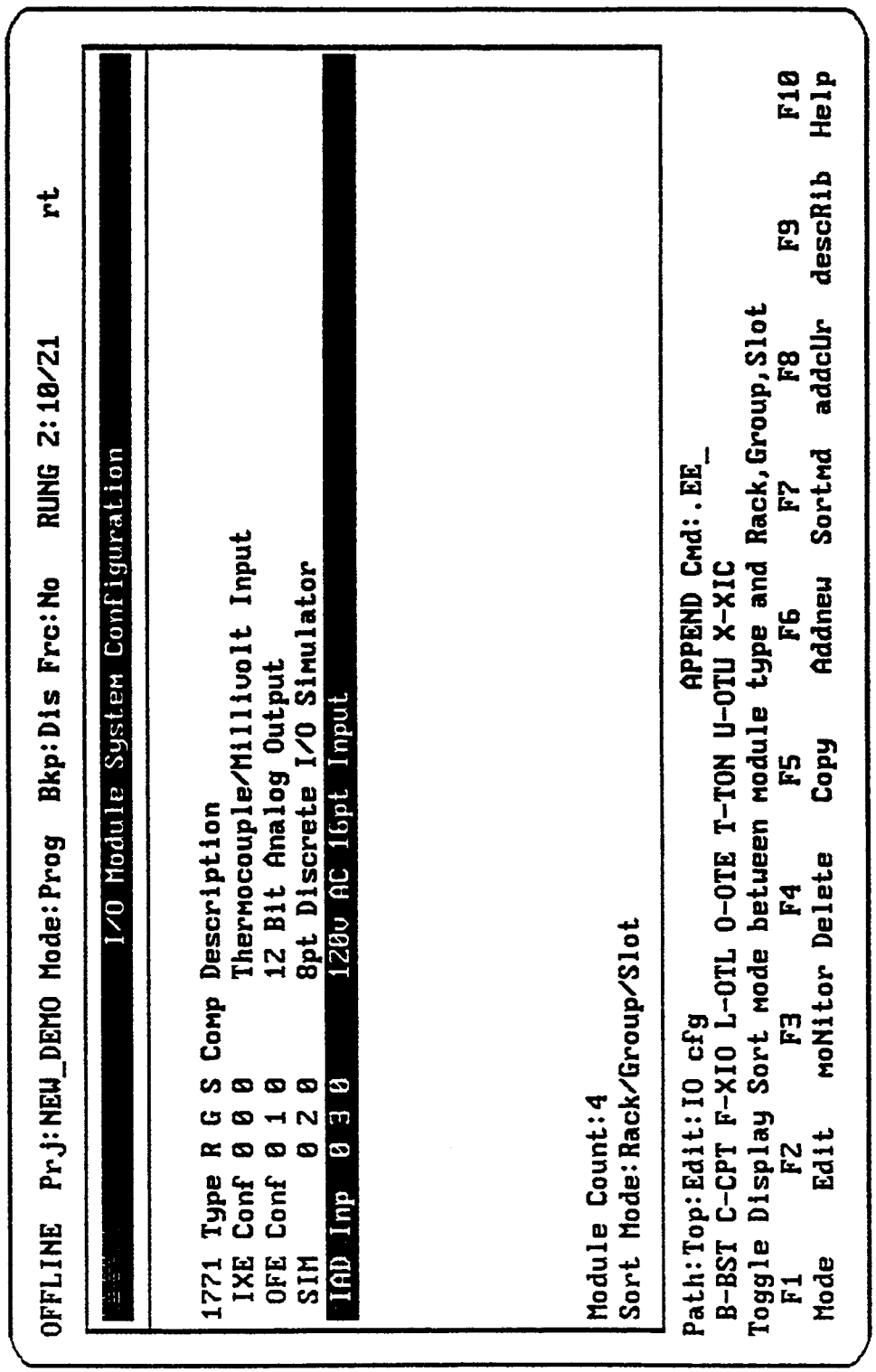
FIG. 16 illustrates an I/O Module System Configuration menu, wherein a list currently configured I/O modules is displayed.

FIG. 16 illustrates an I/O Module System Configuration menu, wherein the user identifies all I/O modules to the software package. This system simplifies module setup. Configuration is accomplished by making menu choices, not by setting individual bits. The Configurator, in conjunction with the auto-addressing function, helps the user keep track of used and unused I/O points. To simplify viewing, this list 178 can be sorted alphabetically by the module's catalog identifier 180, or the list can be sorted numerically by rack, group, and slot (RGS) location 182.

Module configurations can be added, copied, or deleted. Adding a module involves selecting the module's catalog identifier 180 from a list, and entering rack, group, and slot (RGS) location 182 into the software package. The user may also add a brief description 184 of the module as well as information on the number of available points. The information entered into the Configurator is stored on disk, thereby eliminating the need to re-enter this information every time a ladder logic program 38 is developed. After the user adds a discrete I/O module to the Configurator, each instruction in the ladder logic program that references an address on that module will display a catalog identifier 180, for example, the highlighted "IAD" mnemonic 186 shown in FIG. 16.

Figure 17:
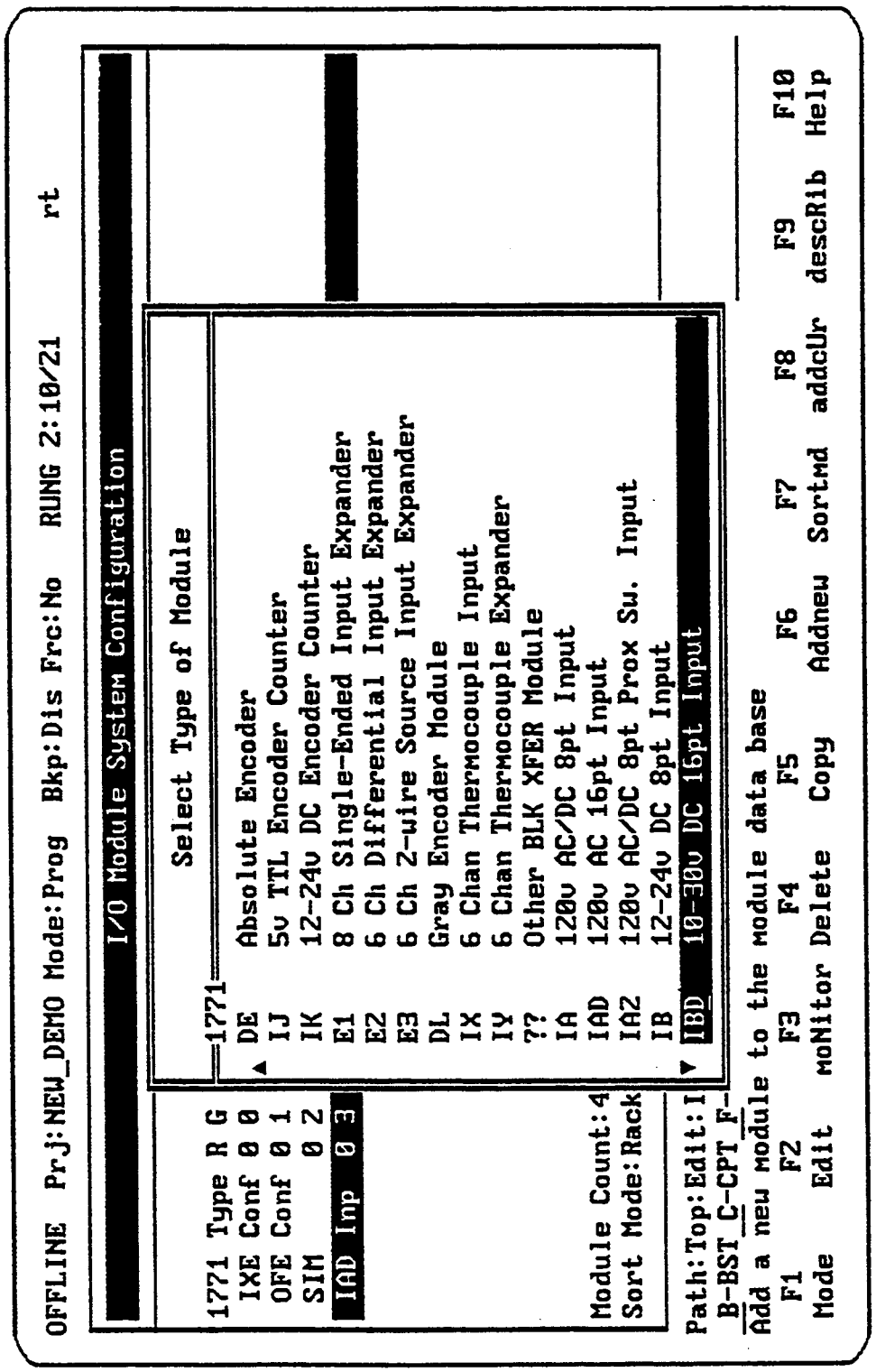
FIG. 17 is a screen that displays a list of I/O module types when a user requests the addition of a new I/O module to the list of FIG. 13.

When the user presses the F6 (Addnew) key 198, a list 208 of I/O module types is displayed as illustrated in FIG. 17. All possible types of I/O modules are contained in the list 208. The user positions the cursor 210 on the desired module type, and presses the Enter key to select the I/O module. The user is then prompted by the software package to enter the rack, group, and slot (RGS) location of the I/O module (not shown).

Figure 18:
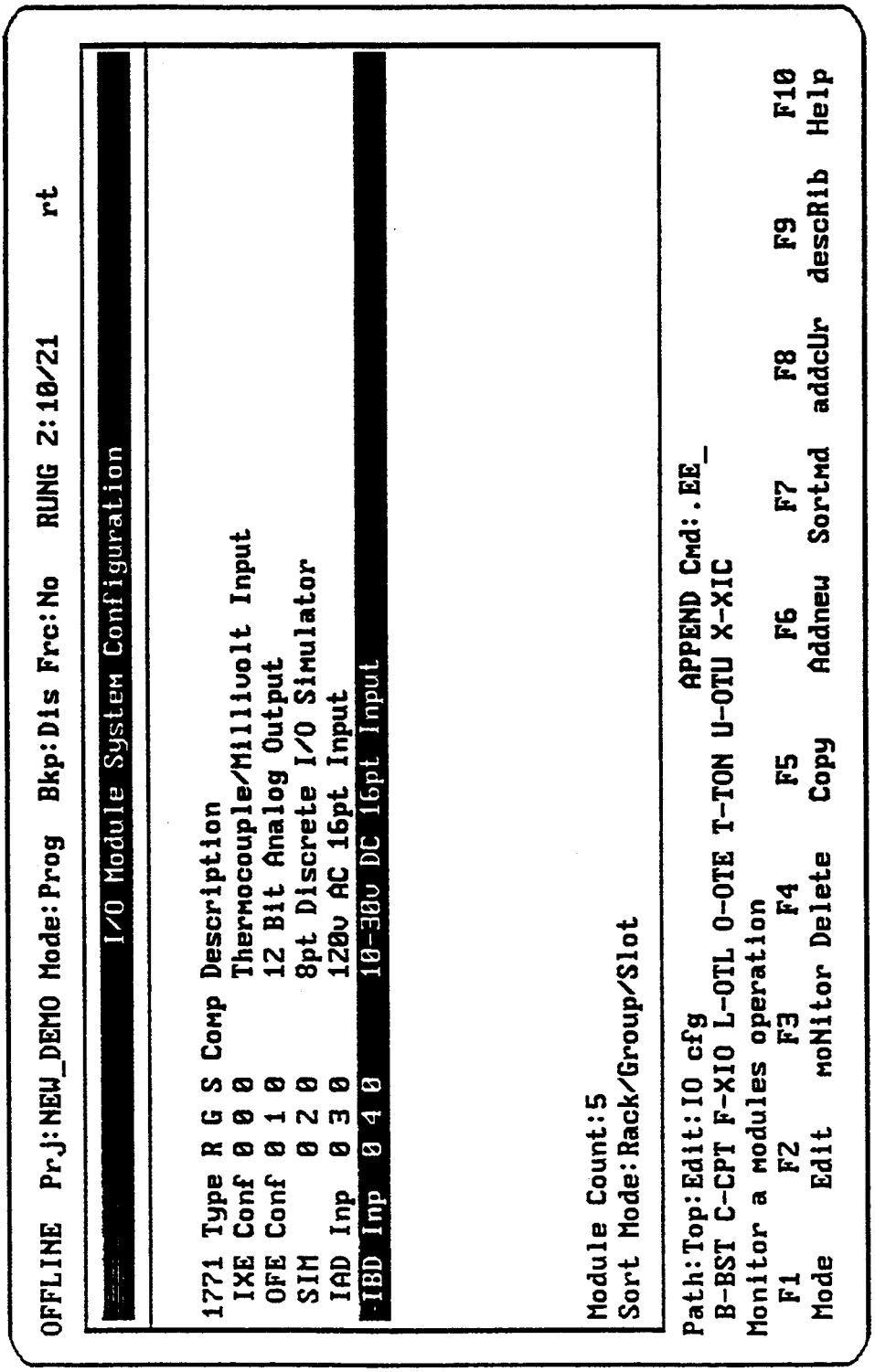
FIG. 18 is the screen of FIG. 13, wherein the new addition is displayed in the list of I/O modules.

FIG. 18 shows the new addition 212 in the list 128 of I/O modules. The highlighted I/O module 212 is a 10–30v DC 16pt Input module as indicated by the "IBD" mnemonic in the "1771" column. The module is an input module as indicated by the "Inp" identifier in the "Type" column. The module is located at rack 0, group 4, slot 0, as indicated by the "040" identifier in the "RGS" columns. The module is further identified by the Description field.

Figure 19:
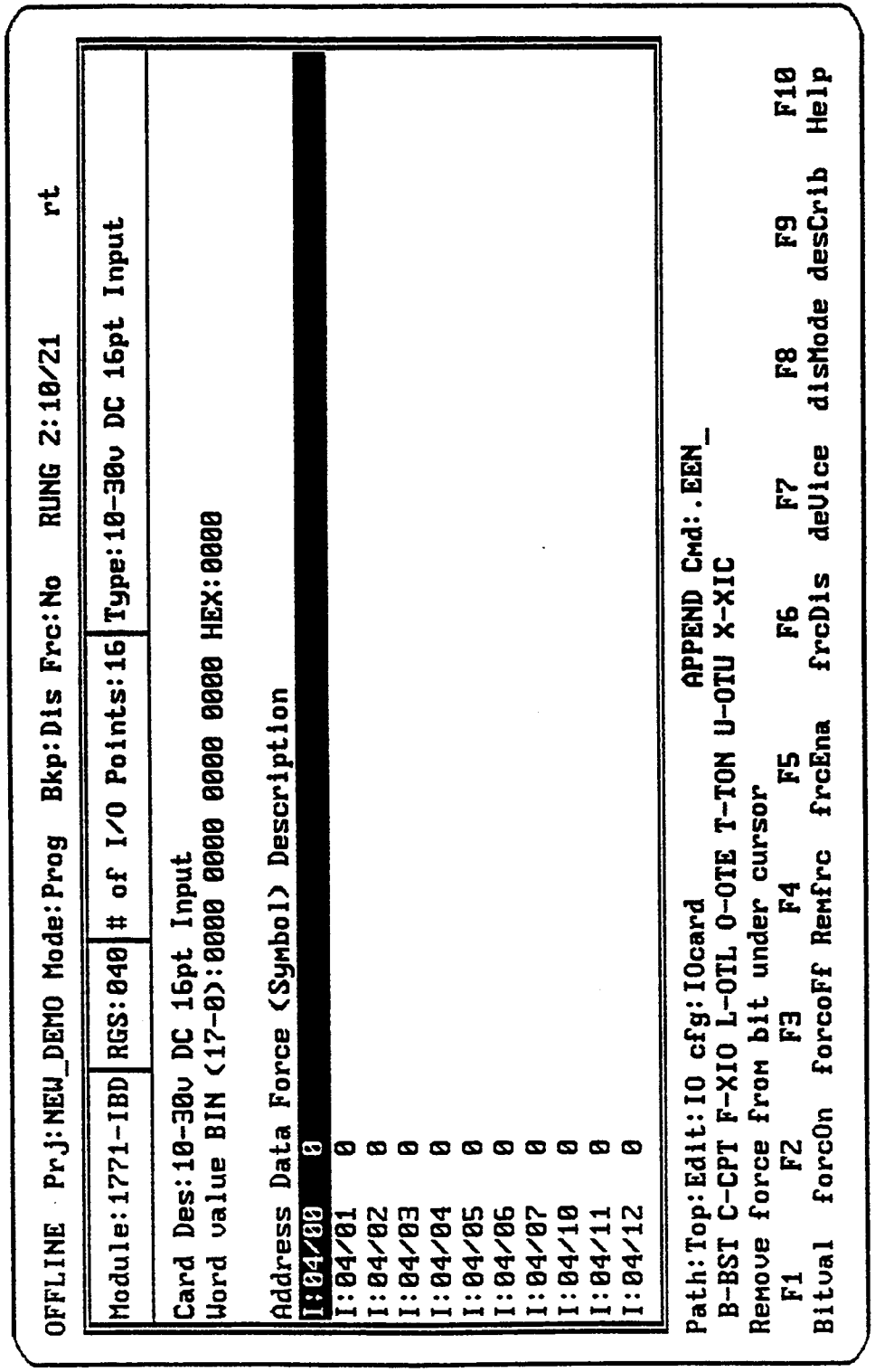
FIG. 19 is a monitor screen which displays the status of a selected I/O module.

The user can press the F3 (monitor) key 192, to monitor the status of the highlighted I/O module 212. FIG. 19 shows a monitor screen 36 which displays the status of the I/O module (from an Emulator run or in real-time from a PLC). Across the top of the screen, the I/O module 214 is described as an 1771-IBD module, residing in RGS 040 216, having 16 I/O points 218, and its type is described as a 10–30v DC 16pt Input module 220. The corresponding bits in the input image table are shown next to the legend "Word Value BIN (17-0):" 220 in both binary format 224 (the first 16 zeros) and hexadecimal format 226 (the four zeros next to the legend "HEX: "). Further down on the screen is a list of each I/O point 228 and its status 230. The address of each I/O point on the module as indicated by the "I:04/nn" identifier 228 in the "Address" column, wherein the "nn" portion of the identifier refers to the number of the I/O point ($00_8$–$17_8$). The status of each I/O point is indicated by a "0"0 (for OFF) or "18 (for ON) 230 identifier in the "Data" column. If an I/O point has been forced to a certain status, this is indicated by a "0"0 (for forcoFF) or "18 (for forcOn) identifier in the "Force" column 232. If a symbol has been attached to the I/O point, the symbol is indicated in the "(Symbol)" column 234. The symbol is further identified by the Description field 236.

An I/O point in the module is selected on the monitor screen by positioning the cursor thereon, as indicated by the highlight bar 238 on I/O point "I:04/00". The user can toggle the corresponding bit in the Data Table by pressing the F1 (Bitval) key 240. The F2 (forcOn) 242 and F3 (forcoFf) 244 keys force the bits in the Data Table to the status of ON or OFF. The F9 (desCrib) key 256 invokes the Instruction Description Editor, from the which the I/O points can be attached to symbols.

Figure 20:
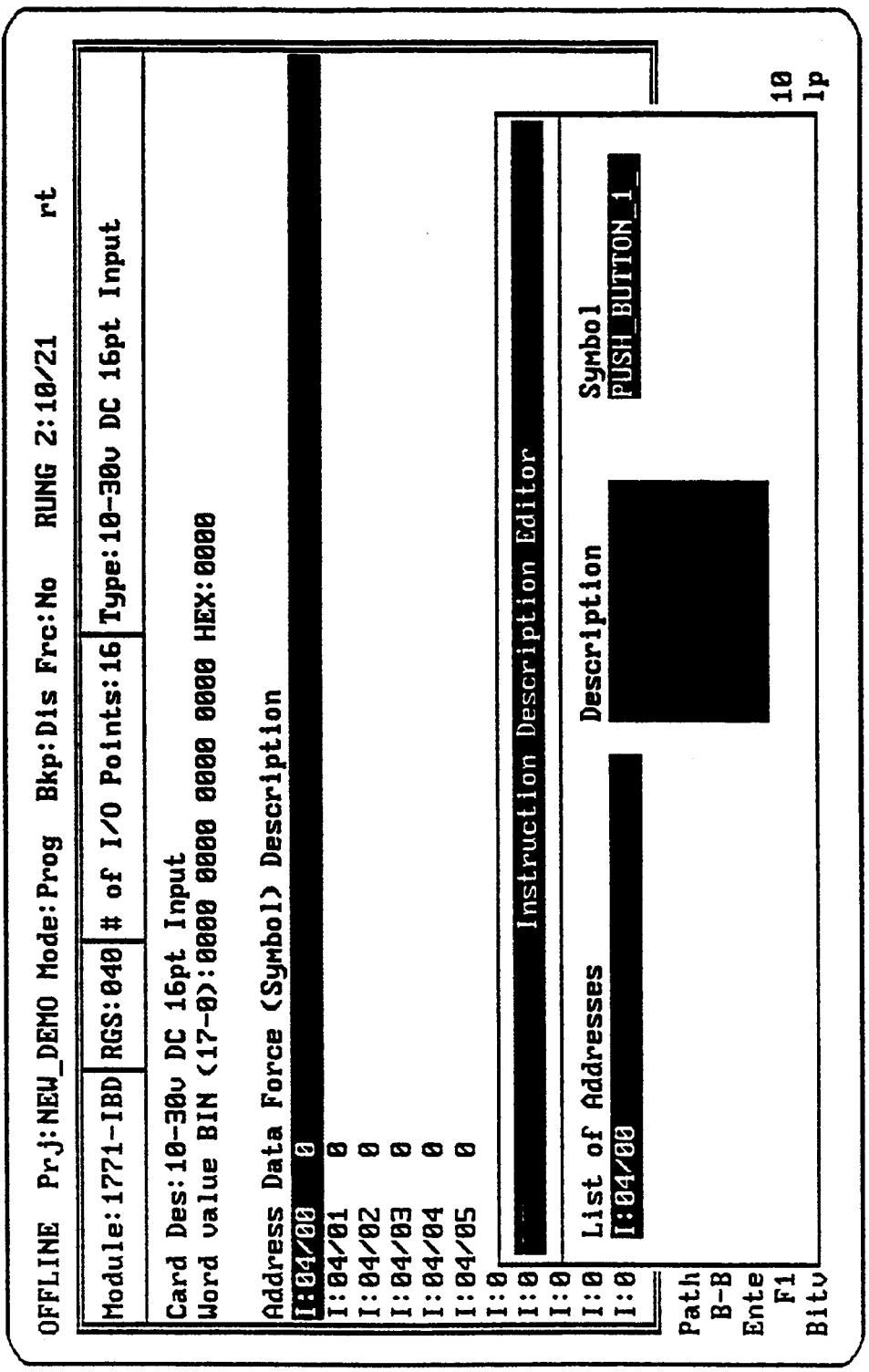
FIG. 20 an Instruction Description Editor window overlaying the screen of FIG. 19, wherein the user attaches a symbol to an I/O point.
Figure 21:
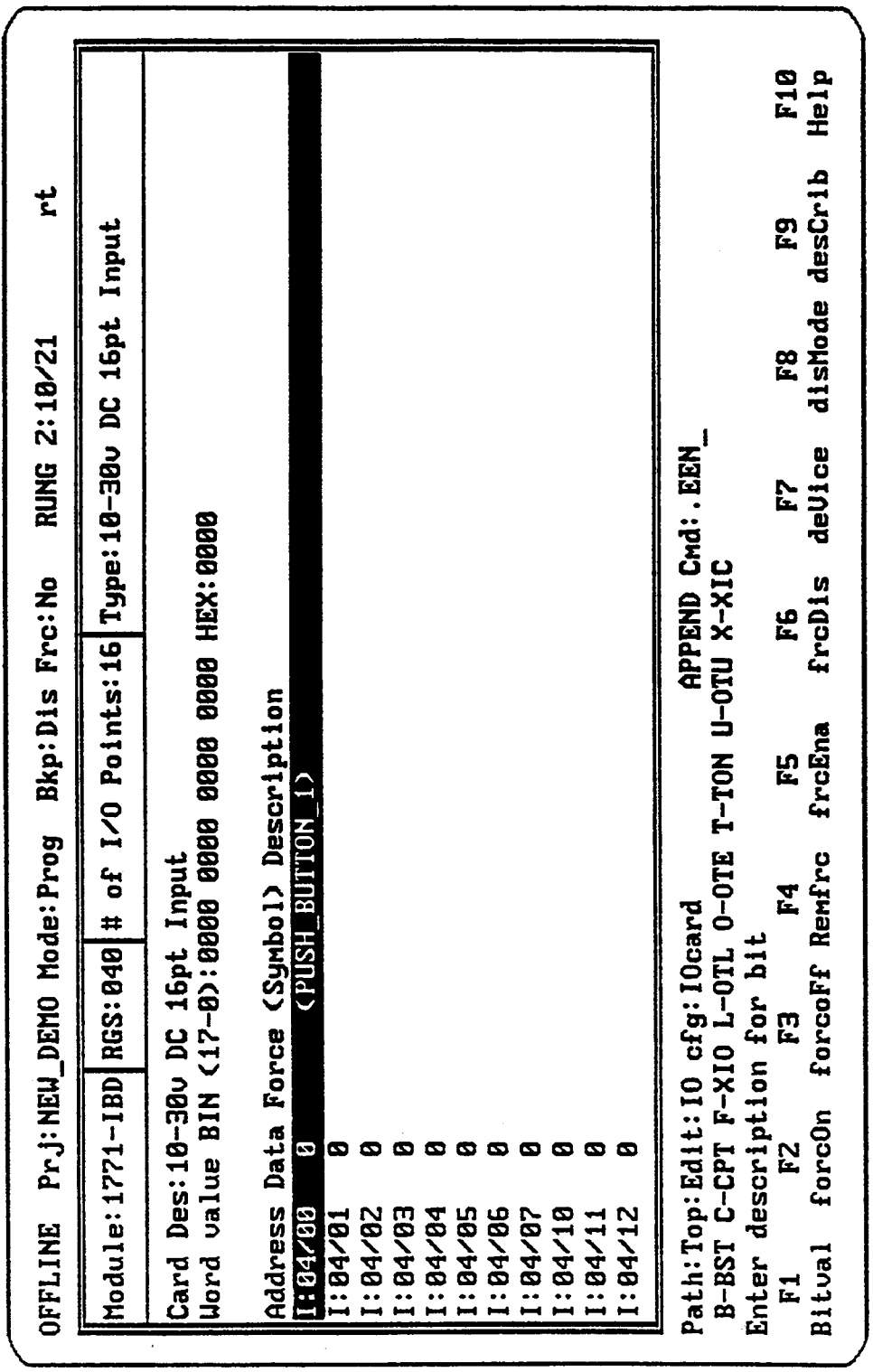
FIG. 21 is the monitor screen of FIG. 19, wherein the symbol PUSH_BUTTON_1 has been attached to the I/O point I:04/00.

FIG. 20 illustrates the Instruction Description Editor, invoked by pressing the F9 (desCrib) key 256, which causes a small window 260 to overlay the monitor screen 36. Three fields 262, 264 and 266 are available in the Instruction Description Editor window 260. The field 262 labeled "List of Addresses" contains the address 268 of the highlighted I/O point. Alternatively, the user can enter a different address. The field 264 labeled "Description" permits the user to describe the symbol. The field 266 labeled "Symbol" is where the user enters the symbol 278 to which the address is attached. In FIG. 20, the user enters the symbol PUSH_BUTTON_1 270 and, by pressing the Enter key, attaches it to the address I:04/00 268. Symbols and descriptions should be tied to the I/O points before any program editing is done. Thereafter, the user need not reference I/O points by their actual addresses. Instead, the user can reference I/O points using the associated symbol. FIG. 21 shows the monitor screen 36 of FIG. 19, wherein the symbol PUSH_BUTTON_1 270 has been attached to the I/O point I:04/00 268.

Auto-Addressing of I/O Modules

Figure 22:
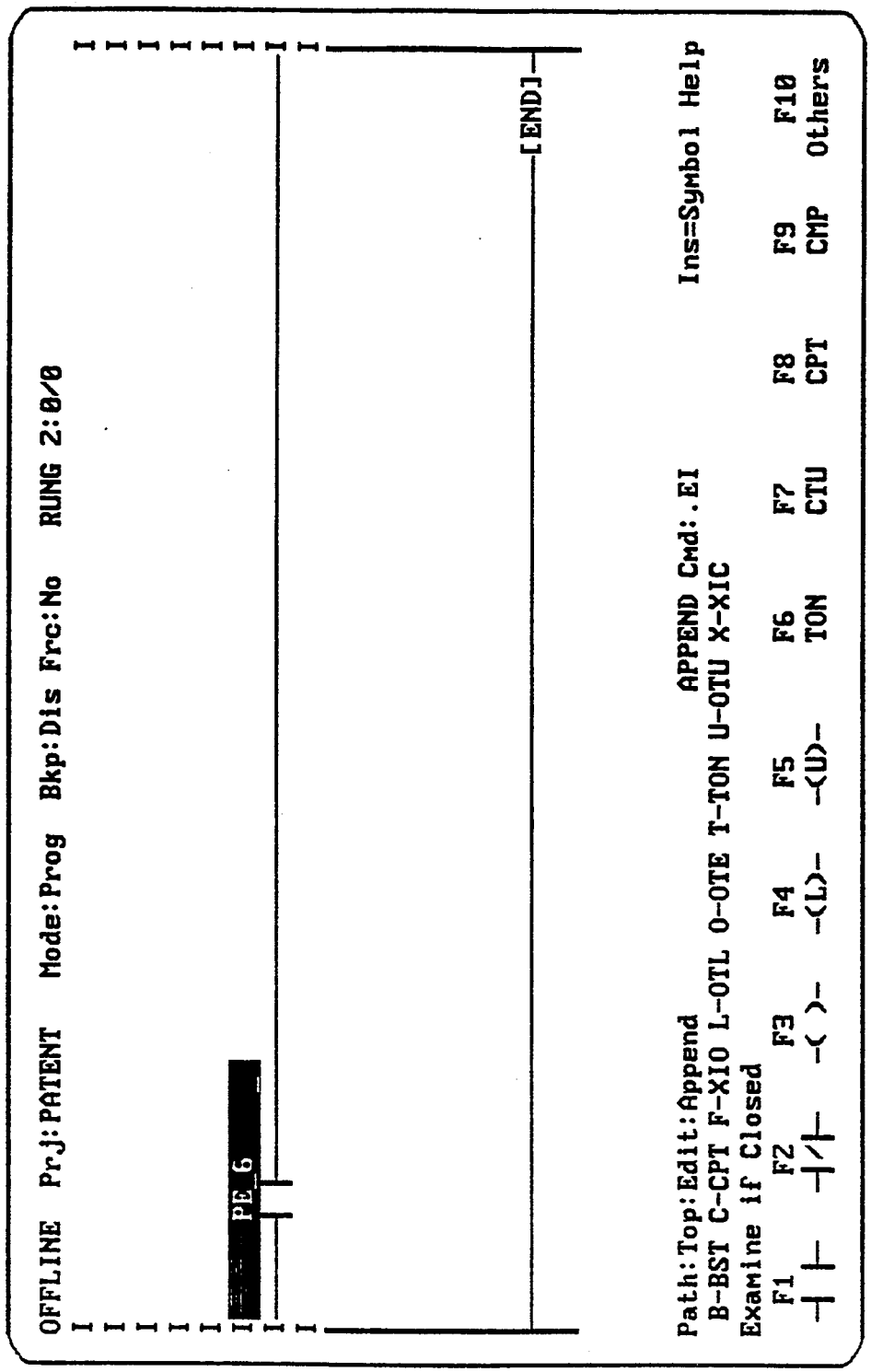
FIG. 22 is a ladder logic rung, wherein the user has entered a symbol PE_6 for the Examine If Closed instruction.

FIG. 22 shows a ladder logic programming example, similar to FIG. 7, wherein the user has entered the Examine If Closed instruction 272. At this point, the user enters either an address, or a symbol representing the address, for the Examine If Closed instruction 272. Alternatively, the user can press the Insert key and a list of user-defined symbols will be displayed, as described herein later.

Figure 23:
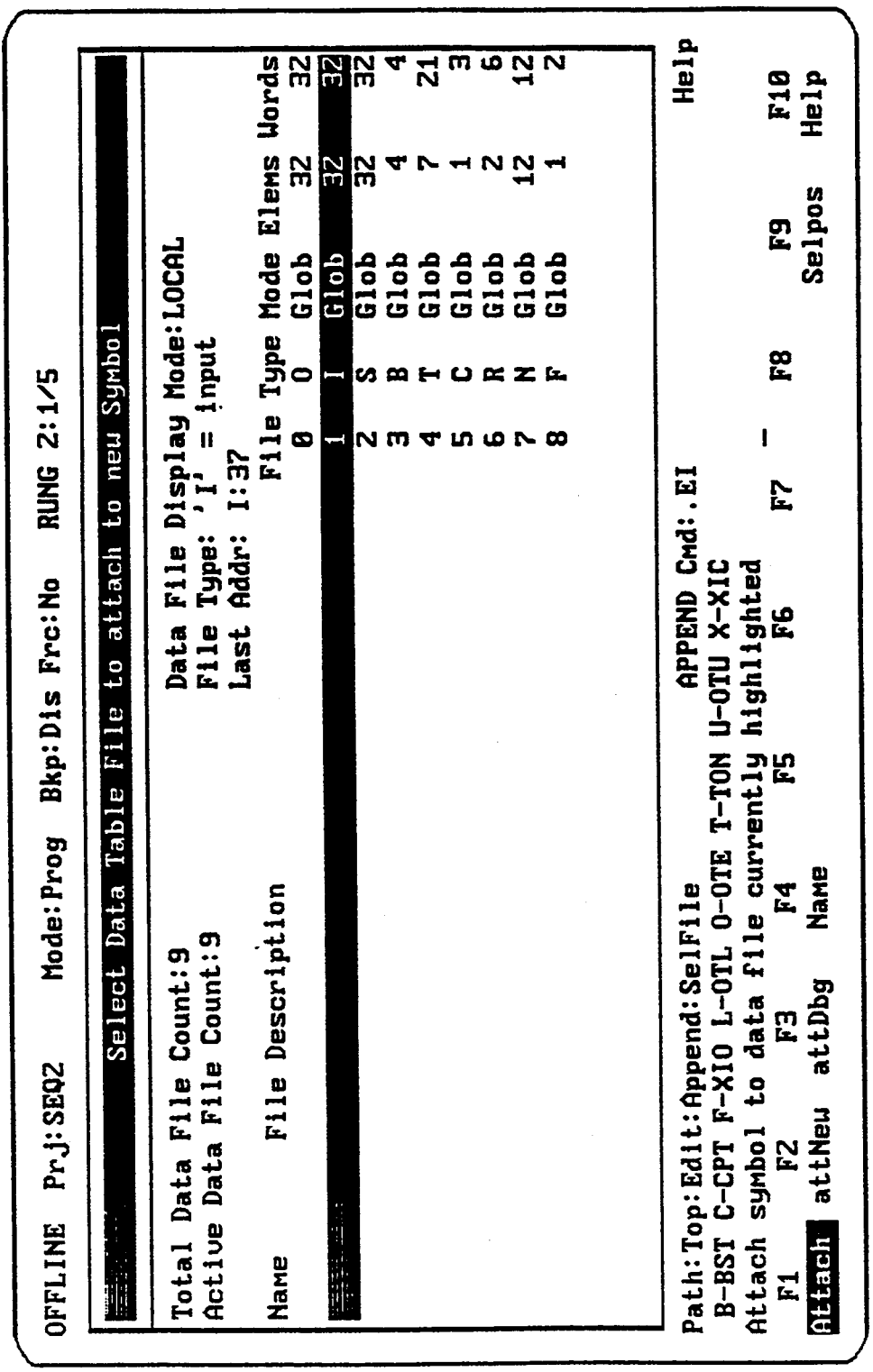
FIG. 23 is a screen displaying a list of Data Table files, wherein the cursor is positioned as illustrated by the highlight bar.

Assume that the user wishes to assign a symbol to an I/O point in an input module, so that a signal can be monitored. The user enters the symbol PE_6 274 into the field 276, the Enter key is pressed, and FIG. 23 is displayed. FIG. 23 shows a list of the Data Table files. To attach the symbol to an input or output module, the cursor 112 would be re-positioned on Data Table files #0 (278) or #1 (280). Data Table file #0 (278) is an output image table as indicated by the "0"0 identifier 282 in the "Type" column. Data Table file #1 (280) is an input image table as indicated by the "I" identifier 284 in the "Type" column. Because the user wishes to attach the symbol PE_6 274 to an I/O point in an input module, file #1 (280) is selected. When file #1 (280) is selected, and the F1 (Attach) 128 or F9 (Selpos) 136 keys are pressed, FIG. 24 is displayed.

Figure 24:
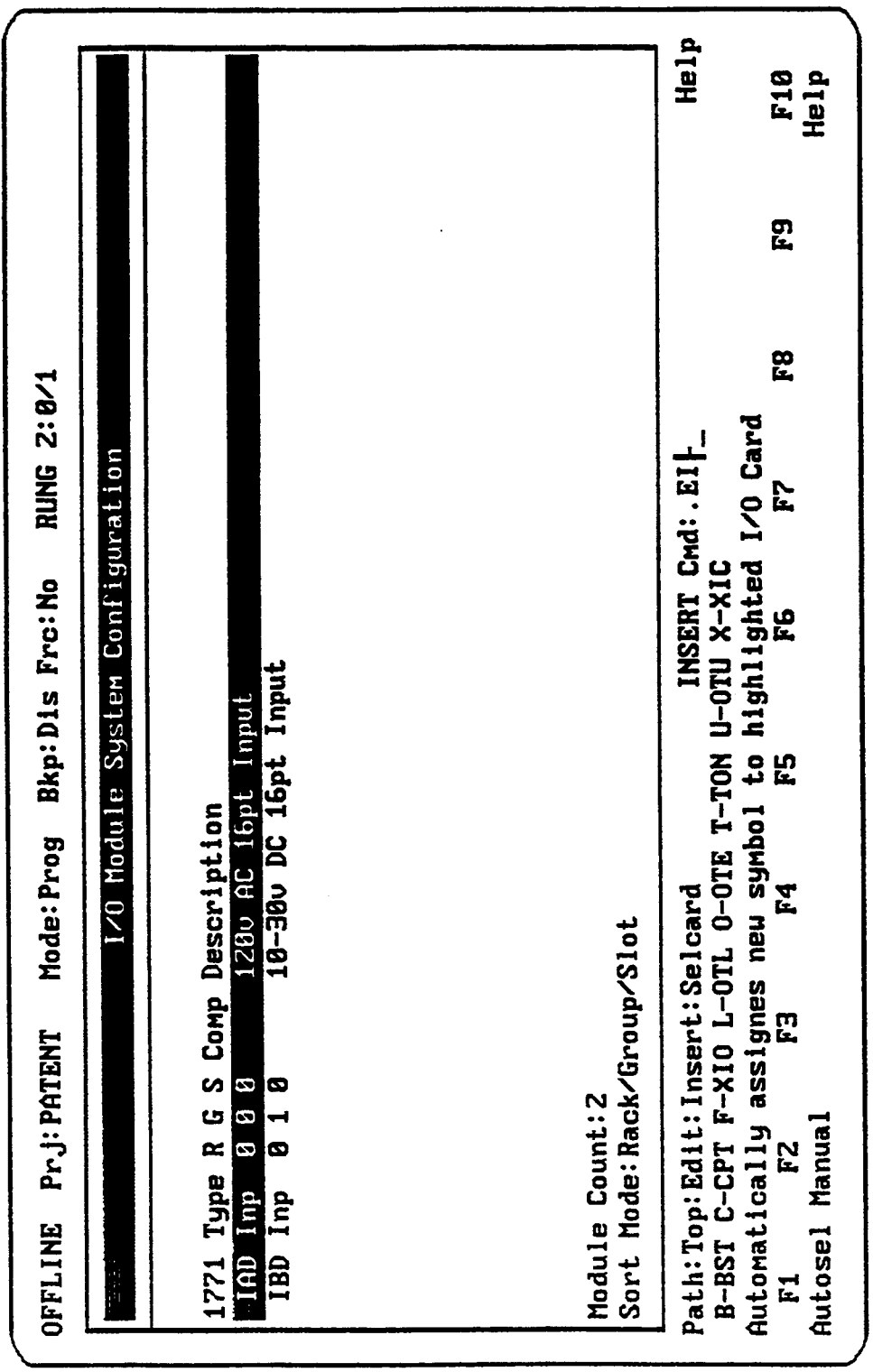
FIG. 24 is a screen that displays a list of input modules when a user requests the attachment of the symbol PE_6 to an input image Data Table file in FIG. 23.

FIG. 24 shows the I/O Module System Configuration menu 178, described herein earlier, where the user attaches symbols to the I/O modules. Because the input image table was selected in FIG. 23, only input modules 286 are shown. The list 178 shows all input modules 286 configured in the software package. When attaching a symbol to an I/O address, the user has two options: the Auto Select option invoked by pressing the F1 (Autosel) key 288; or the Manual Select option invoked by pressing the F2 (Manual) key 290.

Figure 25:
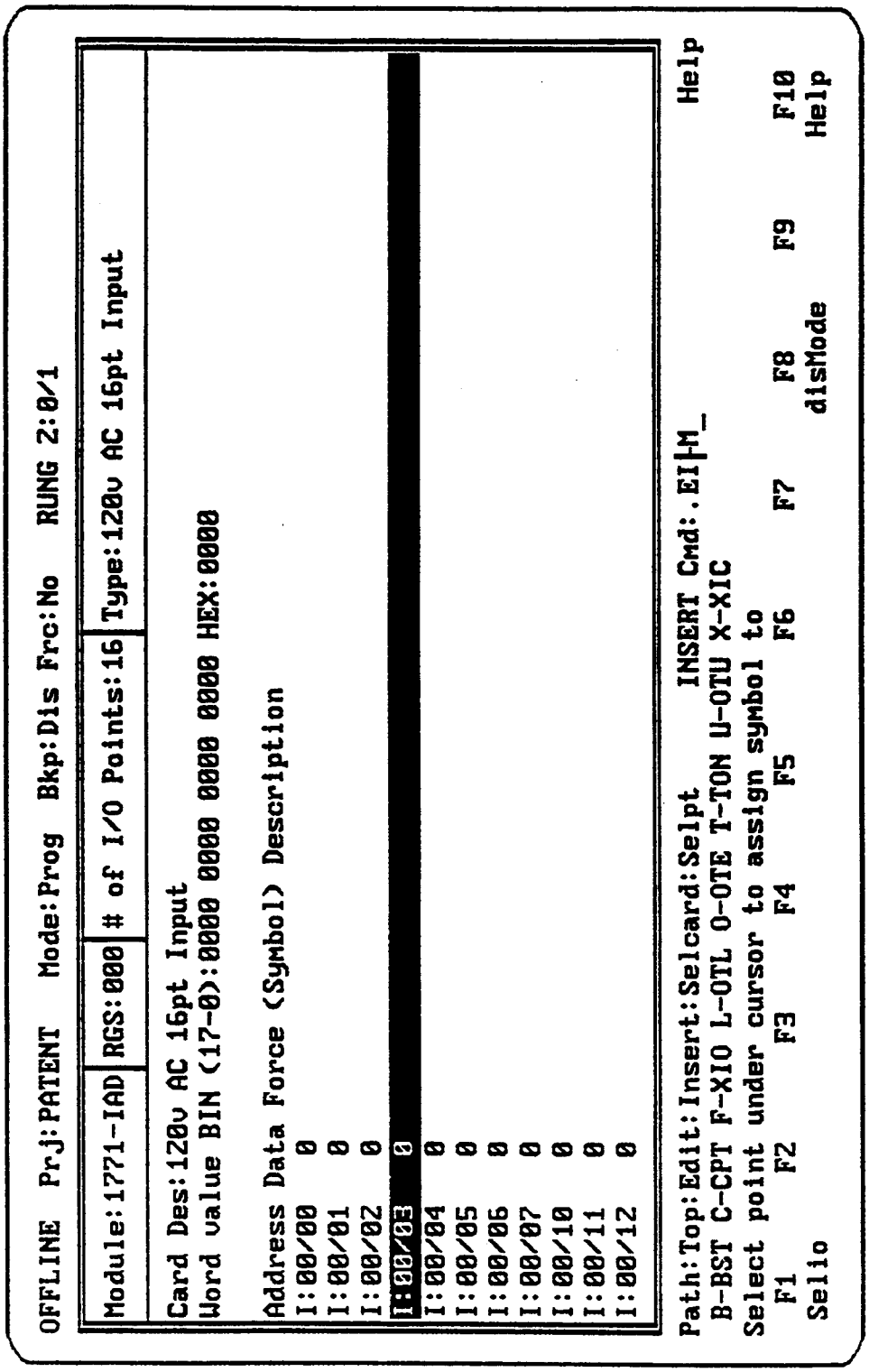
FIG. 25 is a screen that displays shows a list of all I/O points (addresses) for a selected input module of FIG. 24.

The Auto Select option takes the first unused address (bit) in the highlighted I/O module 292 and attaches the symbol to it. The Manual Select option permits the user to display the I/O module addresses and manually select the address to which the symbol is attached. FIG. 25 is displayed when the Manual Select option is selected.

FIG. 25 shows the list of I/O points or addresses 228 for the I/O module 214. All 16 addresses 228 of the I/O module 214 are in the list, although only 11 will fit on a screen 36 at any one time. The user positions the cursor 238 and highlights the particular I/O address 228 desired. In FIG. 25, the cursor 238 is positioned on address I:00/03 (i.e., Rack #0, Group #0, Slot #0, and Bit #3). The user presses the F1 (Selio) key 294 to attach the symbol 274 to the address 228.

Figure 26:
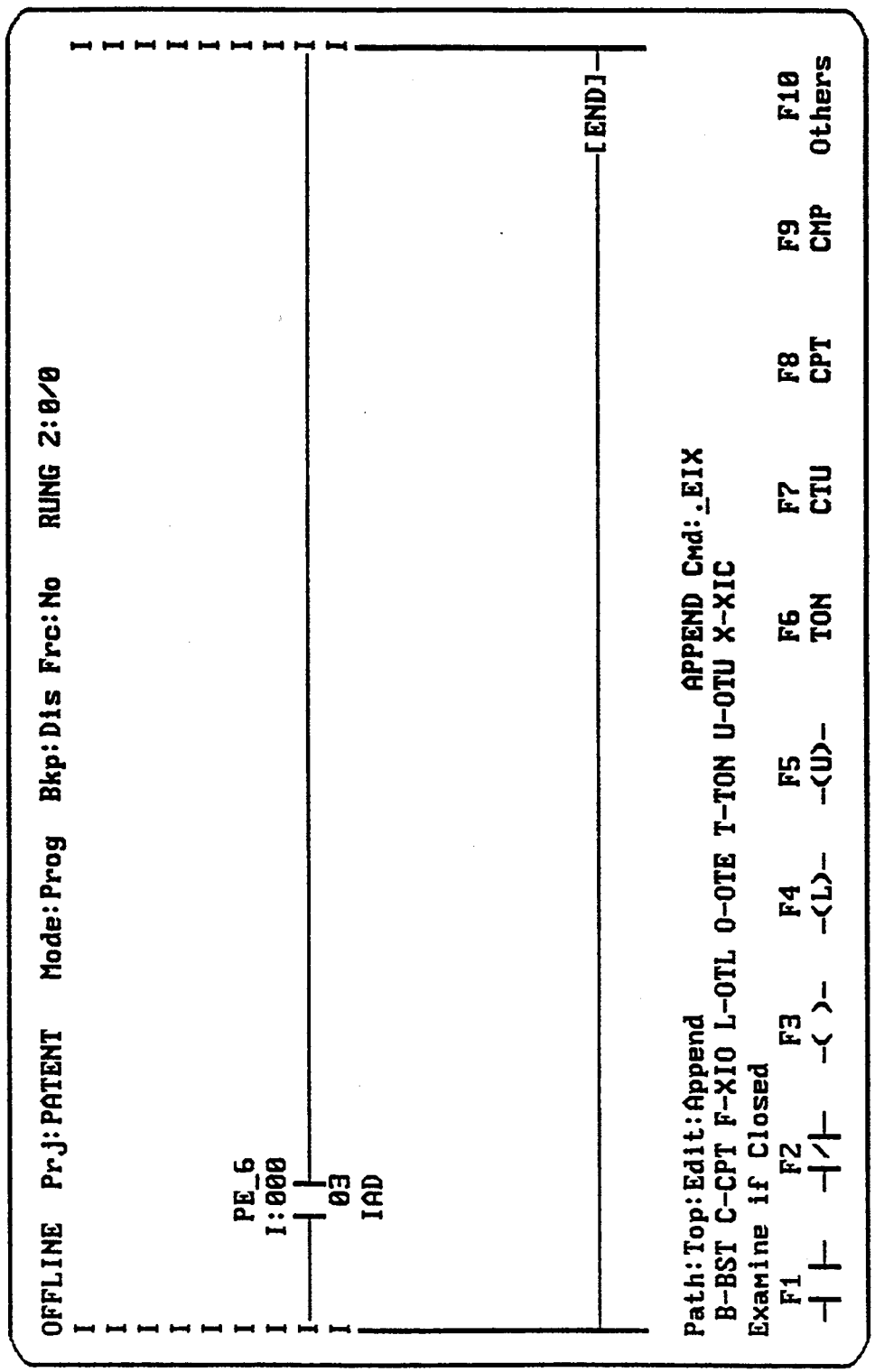
FIG. 26 is the ladder logic rung of FIG. 22, wherein the symbol PE_6 has been attached to I/O address I:000/03.

FIG. 26 shows an example of a ladder logic rung 302 with I/O address I:00/03 296 and 298 attached to the symbol PE_6 274. The particular type of I/O module is identified on FIG. 26 using the mnemonic "IAD" 300 (i.e., 120v AC 16-pt Input).

Using Defined Symbols

The software package includes powerful search features to help the user manage symbol use and generation. As the user enters an instruction, a list of currently defined symbols can be displayed, along with their file-/address types, and their descriptions.

FIG. 27 shows a list of currently defined symbols 304, invoked, for example, in FIG. 7, when the user presses the Insert key. The list of symbols 304 includes the symbol 306, the file type 308, the address type 310, and the symbol description 312. The user can then, position the cursor up or down on the list 304 to select the desired symbol 306. Alternatively, if the user types any characters while the list of symbols 304 is displayed, the software package narrows the symbol search.

A Quick Search option is available, wherein the entry of a portion of a symbol 306 will display all matching symbols 306. This type of search is useful when only part of the symbol 306 is known. For example, while perusing the list 304 shown in FIG. 27, if the user types "S", then the software package will automatically position the cursor to the symbols 306 starting with the character string "S". If the user continues, and types "W", then the software package will automatically position the cursor to the symbols 306 starting with the character string "SW".

Once the user has located the desired symbol 306, he can select it by highlighting the symbol 306, and pressing the Enter key. To cancel the list 304, and return to the address field, the user presses the Escape key.

After the user has selected a symbol 306 from the list 304, the software package may prompt the user for further information, based on the instruction type and the symbol type. For example, if the instruction is bit-oriented and the symbol type is word-oriented, then the software package indicates that the user must supply additional information, i.e., identifying a specific bit in the word.

Figure 29:
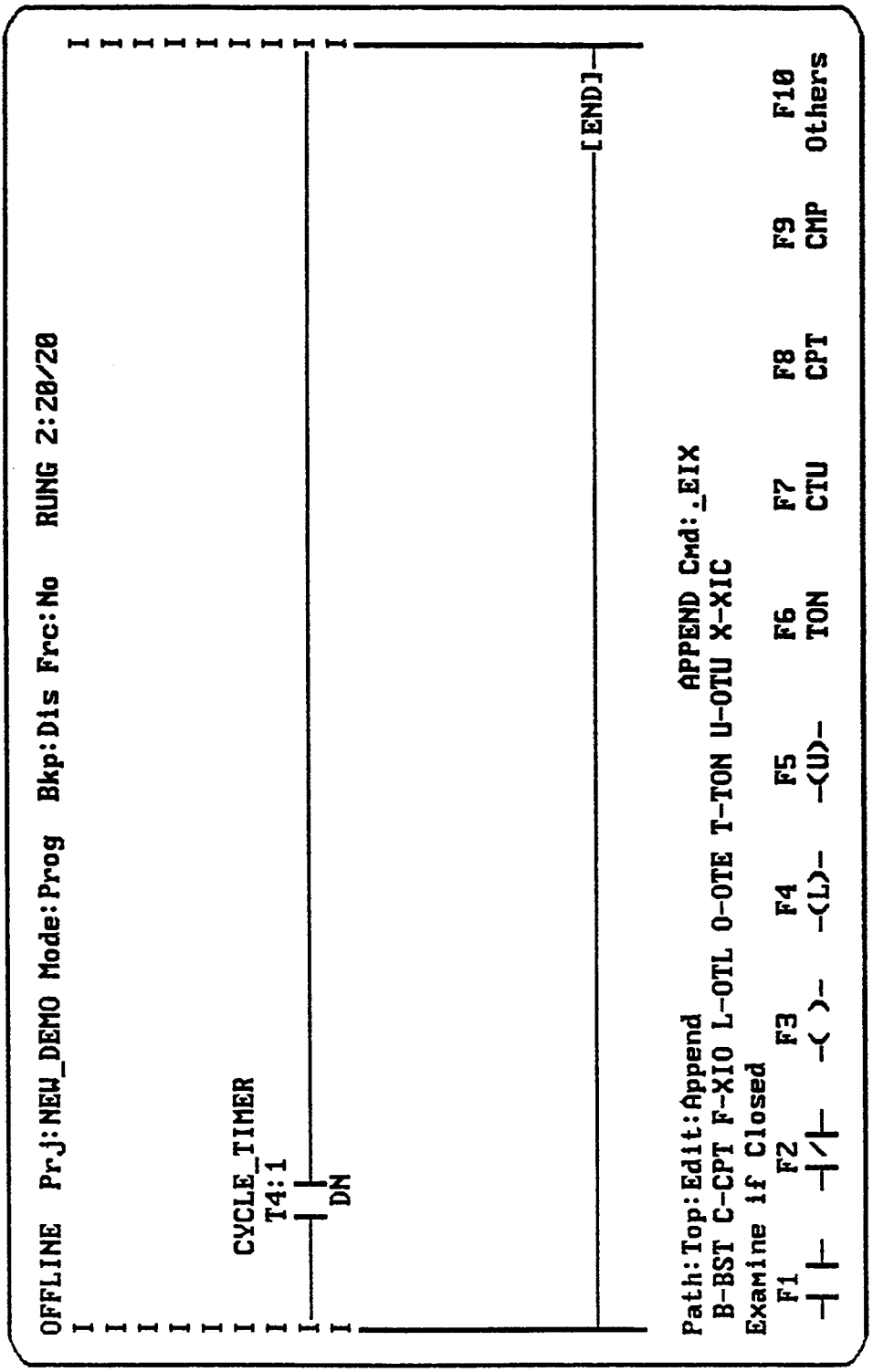
FIG. 29 is the screen of FIG. 28, wherein the suffix .DN has been removed from the symbol CYCLE_TIMER, and the correct bit identifier DN has been placed below the instruction on the screen.

FIG. 28 shows an example where the user is attempting to assign a word-oriented symbol 314 to a bit-oriented instruction 316. When the software package copies the symbol 314 from the list 304 to the field 318, the cursor remains positioned in the field 318 so the user can specify which bit of the word-oriented address is to used with the instruction 316. Some bits are predefined, for example, symbol suffixes .DN for "done" bits, .EN for "enable" bits, .TT for timing bits, or .XX for bit positions, wherein XX is a decimal value between 00 and 15. In some cases, the software package knows which bit of the word-oriented address to use with the instruction 316 and automatically supplies it. The software package can also check for boundary conditions, i.e., ensuring that bit positions are addressed only from 00-15. After the user specifies which bit to use, the software package translates the bit into the correct ladder logic rung display. For example, after the user enters the .DN suffix 314 in FIG. 28, and presses the Enter key, the software package displays FIG. 29. FIG. 29 shows that the .DN suffix has been removed from the symbol 314, CYCLE_TIMER, and the correct bit legend 322, "DN", has been placed below the instruction 316 on the ladder logic rung 320.

Block Move Re-Addressing

Figure 30:
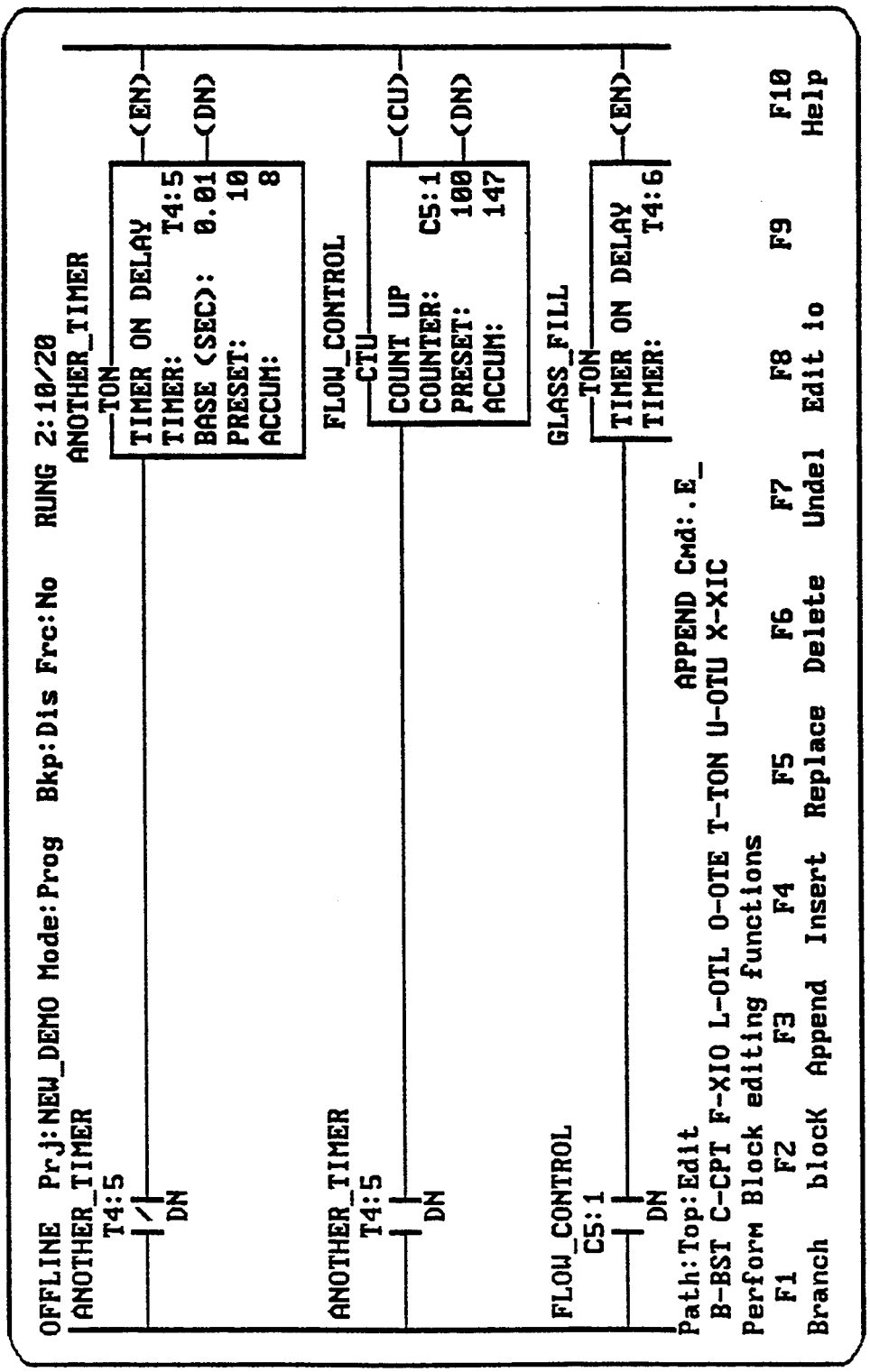
FIG. 30 is a screen that displays three ladder logic rungs from a ladder logic program.
Figure 32:
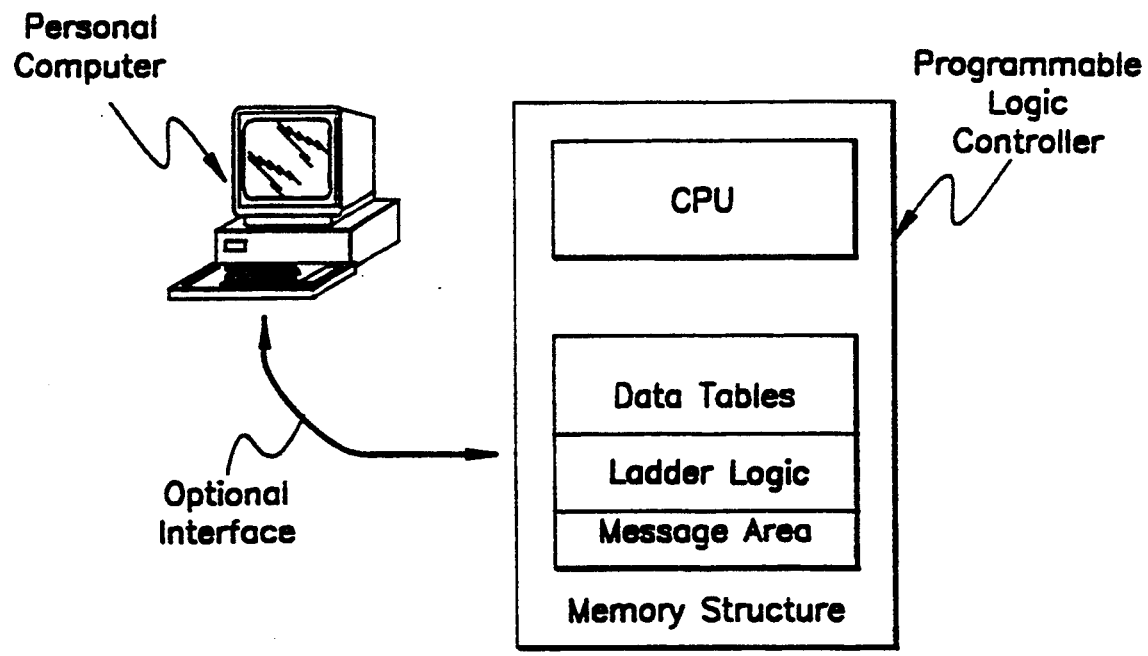
FIG. 32 is an illustration describing a programmable logic controller with an optional computer attached thereto.
Figure 33:
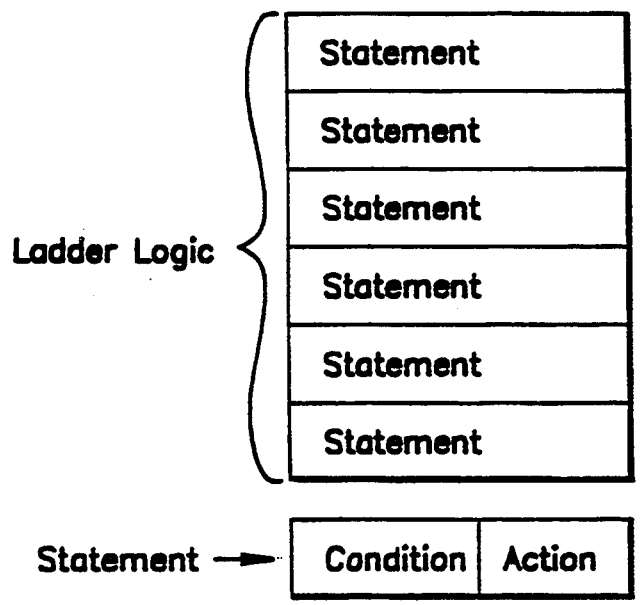
FIG. 33 is an illustration describing the structure of a ladder logic program in the programmable logic controller.

The software package also has the ability to re-address both symbols and addresses when performing block operations on ladder logic rungs. For example, FIG. 30 shows three rungs 324, 326 and 328 from a ladder logic program 38. Assume that the user wishes to add a block of "generic" rungs from another library file into the ladder logic program 38 immediately following the second rung 326 shown in FIG. 30. However, some of the addresses and symbols used in the "generic" rungs may already be in use by the ladder logic program 38. Re-attaching all the symbols, or, re-assigning all the addresses, in the "generic" rungs would be tedious and time-consuming. The software package permits a simpler way.

FIG. 31 shows the Edit Address screen 330, wherein symbols and/or addresses in the block of rungs being moved can be re-attached or re-assigned in a batch operation. The first column 332, labeled "Address", shows currently used addresses in the block of rungs. The second column 334, labeled "Fixup", shows how those addresses are to change in the batch operation. The user changes the addresses by specifying a new address in the "Fixup" column 334. For example, in the highlighted row 340, the address R6:2 is changed in "Fixup" to R6:23. The third column 336, labeled "Type", indicates the type of batch operation to be performed on the addresses. If the "Type" field is "Base", then the transformation specified in the "Fixup" column 334 is applied to the value in the "Address" column 332. If the "Type" field is "Relative", then the "Fixup" address is calculated by adding all intervening "Relative" addresses to the most prior "Base" address in the list 336. This permits the software package to automatically determine the amount of storage to allocate. The software calculates the "Relative" addresses immediately when the "Base" address changes. The fourth column 338, labeled "Symbol", allows the user to change the symbol attached to the address.

Conclusion

Although a specific embodiment of the present invention has been illustrated herein, it will be appreciated by those in ordinary skill in the art that any method or arrangement which is calculated to achieve the same purpose may be substituted for the specific embodiment shown. Thus, the present invention disclosed herein may be implemented through the use of different display screens, different commands, different key combinations, and different steps. This application is intended to cover any adaptations or variations thereof. Therefore, it is manifestly intended that this invention be limited only by the claims and the equivalence thereof.

What is claimed is:

1. A method of providing symbol help in a program editor executed by a computer, the program editor being used by an operator for the displaying and editing of a ladder logic program on a monitor attached to the computer, wherein the ladder logic program is comprised of instructions operating on elements of data tables, the method comprising:

(a) maintaining a symbol assignment record in the computer, wherein the symbol assignment record identifies a correspondence between symbols and elements of the data tables, wherein each element is assigned to a specific symbol and each symbol represents a specific element, so that instructions in the ladder logic program reference an element using a symbol representing the element;

(b) displaying a list of symbols obtained from the symbol assignment record on the monitor while the program is being edited, receiving a command from the operator selecting a symbol from the displayed list of symbols, and modifying an operator-identified instruction in the program so that it references the selected symbol; and (c) wherein the displaying step (b) further comprises receiving commands from the operator specifying a portion of a desired symbol, and displaying in the list of symbols only those symbols from the symbol assignment record which match the portion of the desired symbol.

2. The method of claim 1, further comprising receiving commands from the operator identifying additional portions of the desired symbol, and displaying in the list of symbols only those symbols from the symbol assignment record which match the additional portions of the desired symbol.

3. An apparatus for providing symbol help in a program editor executed by a computer, the program editor being used by an operator for the displaying and editing of a ladder logic program on a monitor attached to the computer, wherein the ladder logic program is comprised of instructions operating on elements of data tables, the apparatus comprising:

(a) means for maintaining a symbol assignment record in the computer, wherein the symbol assignment record identifies a correspondence between symbols and elements of the data tables, wherein each element is assigned to a specific symbol and each symbol represents a specific element, so that instructions in the ladder logic program reference an element using a symbol representing the element;

(b) means for displaying a list of symbols obtained from the symbol assignment record on the monitor while the program is being edited, receiving a command from the operator selecting a symbol from the displayed list of symbols, and modifying an operator-identified instruction in the program so that it references the selected symbol; and (c) wherein the means for displaying (b) further comprises means for receiving commands from the operator specifying a portion of a desired symbol, and means for displaying in the list of symbols only those symbols from the symbol assignment record which match the portion of the desired symbol.

4. The apparatus of claim 3, further comprising means for receiving commands from the operator identifying additional portions of the desired symbol, and means for displaying in the list of symbols only those symbols from the symbol assignment record which match the additional portions of the desired symbol.

* * * * *